United States Patent [19]
Kikuchi et al.

[11] Patent Number: 6,046,531
[45] Date of Patent: Apr. 4, 2000

[54] VIBRATOR, VIBRATORY GYROSCOPE, AND LINEAR ACCELEROMETER

[75] Inventors: Takayuki Kikuchi, Nagoya; Shosaku Gouji, Ama-Gun; Yukihisa Osugi, Nagoya; Takao Soma, Nishikamo-Gun, all of Japan

[73] Assignee: NGK Insulators, Ltd., Nagoya, Japan

[21] Appl. No.: 09/108,500

[22] Filed: Jul. 1, 1998

[30] Foreign Application Priority Data

Jul. 4, 1997 [JP] Japan ..................................... 9-179705
Nov. 5, 1997 [JP] Japan ..................................... 9-317774

[51] Int. Cl.[7] ................................................... H01L 41/08
[52] U.S. Cl. .......................... 310/367; 310/311; 310/370; 73/504.03; 73/514.34
[58] Field of Search ..................................... 310/328, 339, 310/367, 311, 361, 370; 73/504.03, 504.16, 514.15, 514.34

[56] References Cited

U.S. PATENT DOCUMENTS

| | | | |
|---|---|---|---|
| 3,206,986 | 9/1965 | Christensen | 310/367 |
| 4,654,663 | 3/1987 | Alsenz et al. | 310/360 |
| 4,930,351 | 6/1990 | Macy et al. | 73/505 |
| 5,166,571 | 11/1992 | Konno et al. | 310/333 |
| 5,196,758 | 3/1993 | Hermann | 310/367 |
| 5,533,397 | 7/1996 | Sugitani et al. | 73/504.16 |
| 5,585,562 | 12/1996 | Kurata et al. | 73/504.16 |
| 5,635,642 | 6/1997 | Nonomura et al. | 73/504.16 |
| 5,747,107 | 5/1998 | Wakatuki et al. | 310/370 |
| 5,821,420 | 10/1998 | Cho et al. | 73/504.16 |
| 5,861,705 | 1/1999 | Wakatsuki et al. | 310/370 |

FOREIGN PATENT DOCUMENTS

| | | | |
|---|---|---|---|
| 62-217115 | 9/1987 | Japan | 73/504.16 |
| 9-128833 | 5/1997 | Japan | G11B 11/10 |

*Primary Examiner*—Thomas M. Dougherty
*Attorney, Agent, or Firm*—Wall Marjama Bilinski & Burr

[57] ABSTRACT

A vibrator comprising a base part at least one of whose ends is fixed, a first leg extending in a direction crossing this base part, a second leg extending in a direction crossing the base part and being opposed to said first leg with respect to said base part, a first bending-vibration piece extending in a direction crossing said first leg, a second bending-vibration piece extending in a direction crossing the first leg and being opposite to said first bending-vibration piece with respect to said first leg, a third bending-vibration piece extending in a direction crossing said second leg, and a fourth bending-vibration piece extending in a direction crossing the second leg and being opposite to said third bending-vibration piece with respect to said second leg.

33 Claims, 25 Drawing Sheets

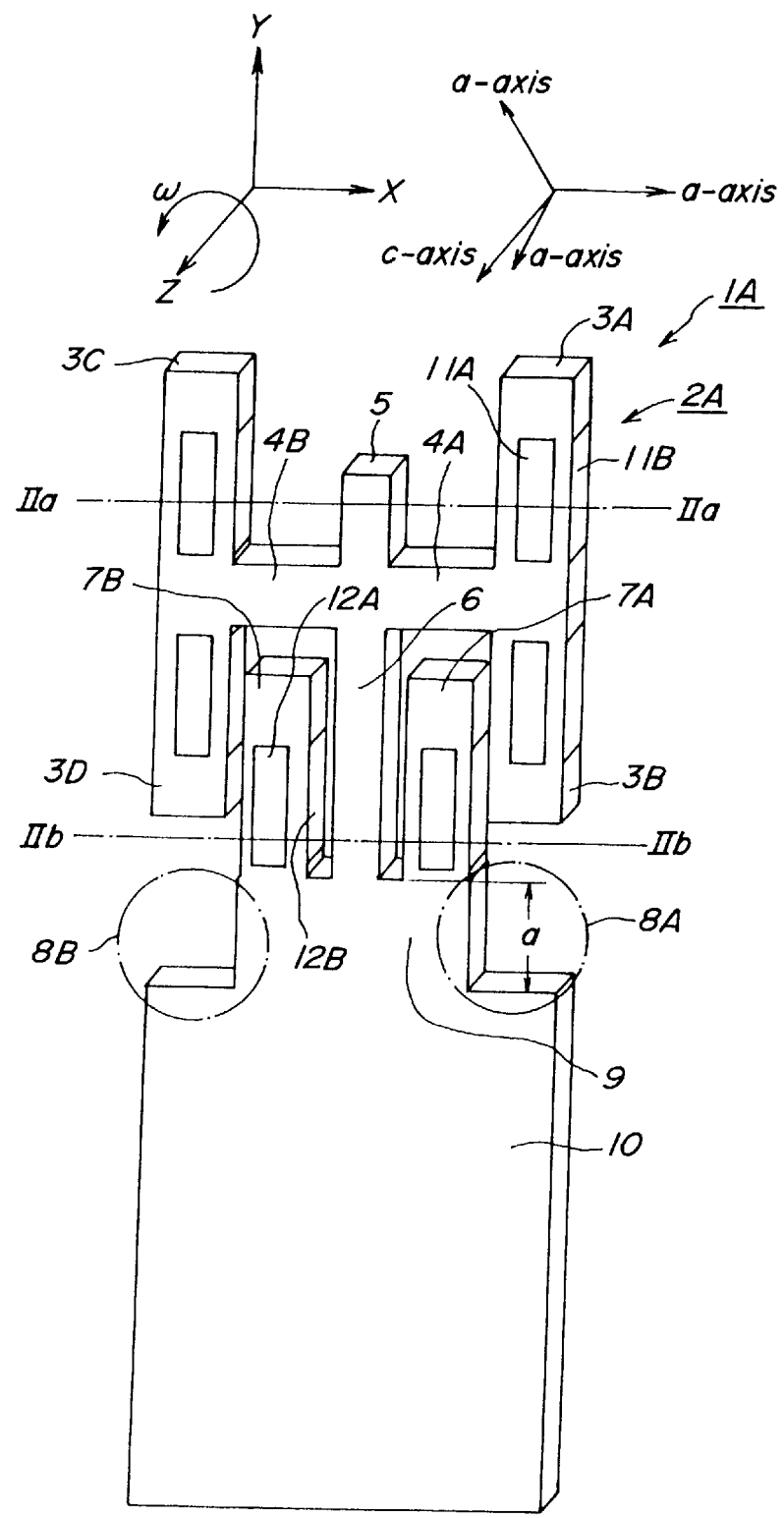
FIG_1

FIG_2a
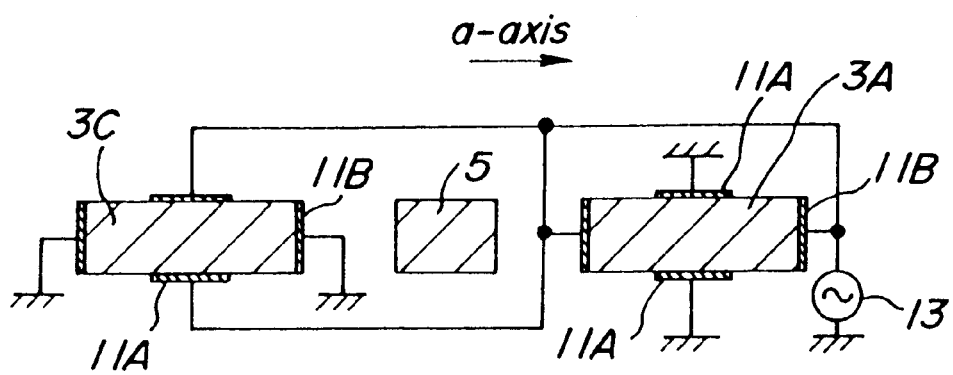
FIG_2b
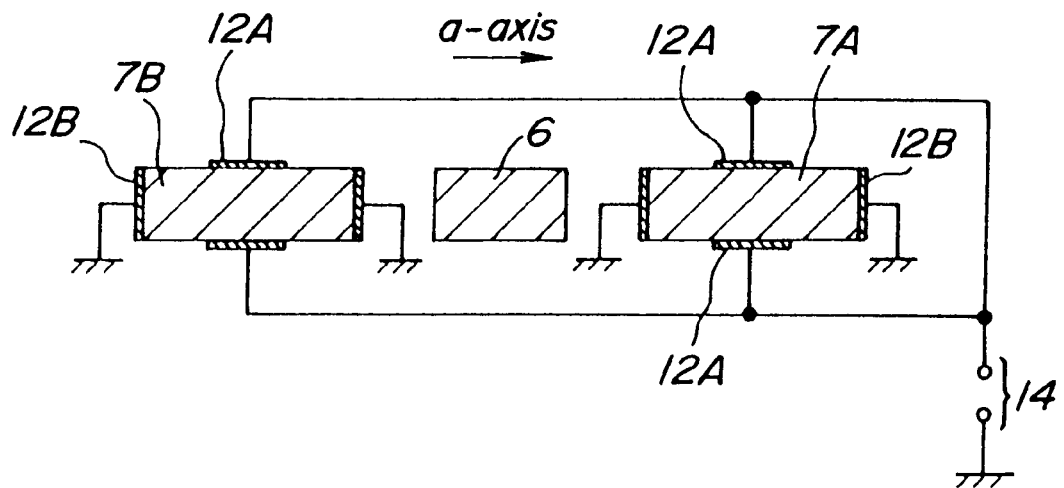

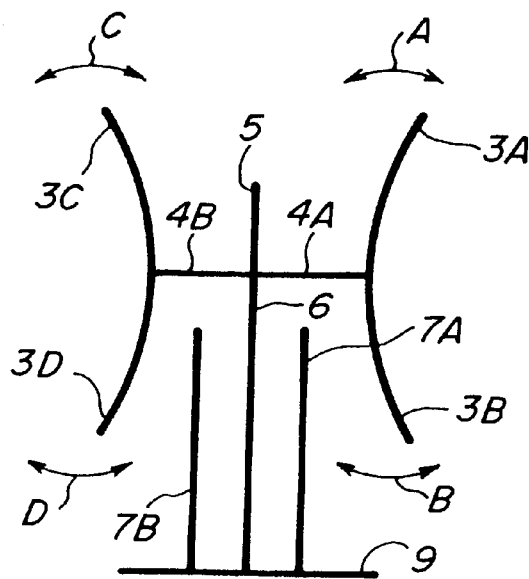
FIG_3a
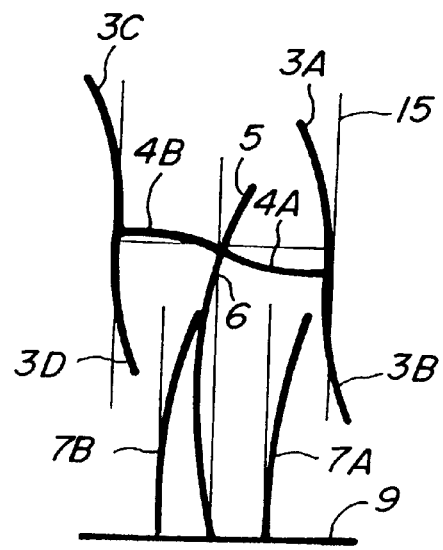
FIG_3b
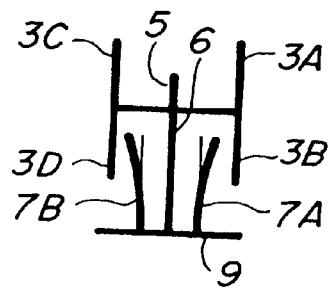
FIG_3c

FIG_4a
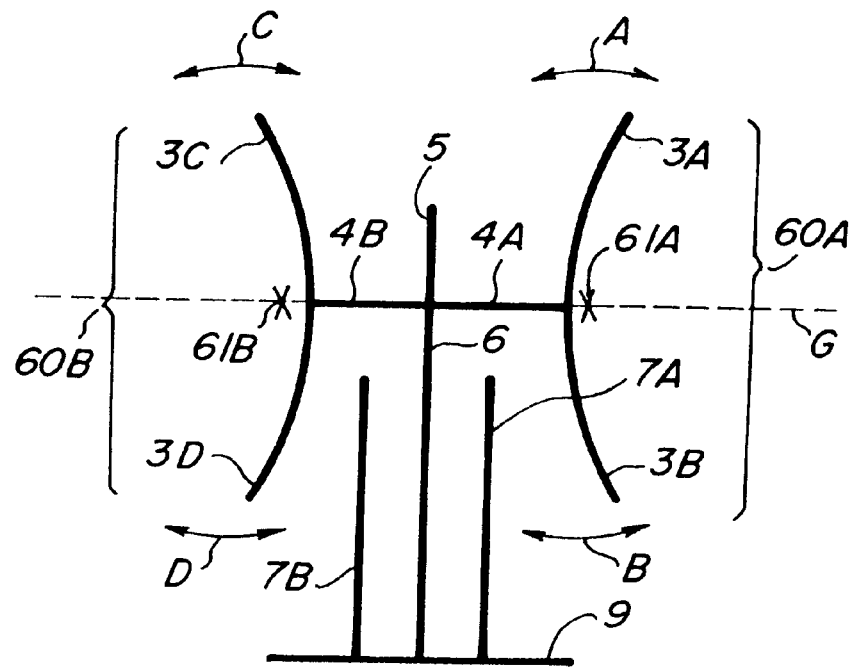
FIG_4b
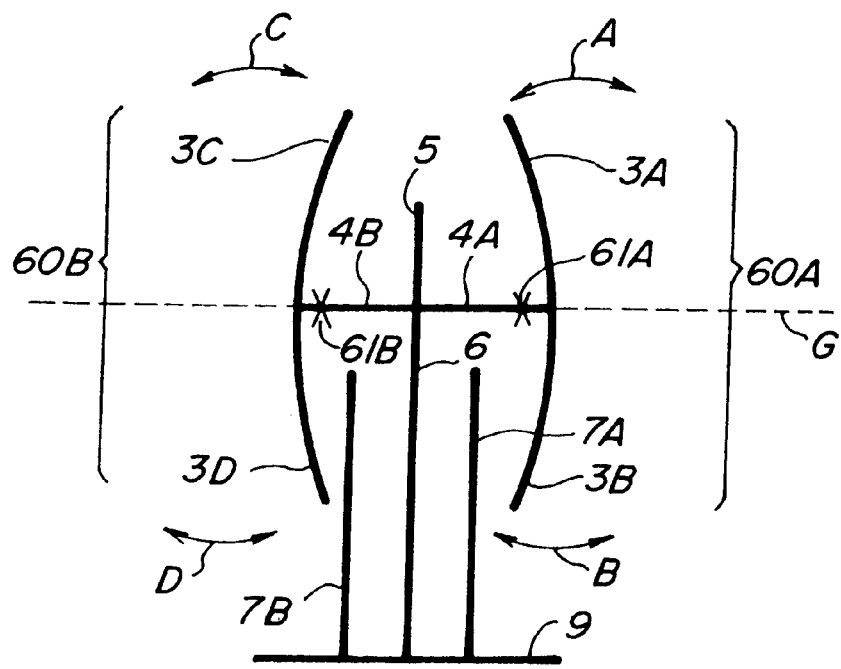

FIG_5a
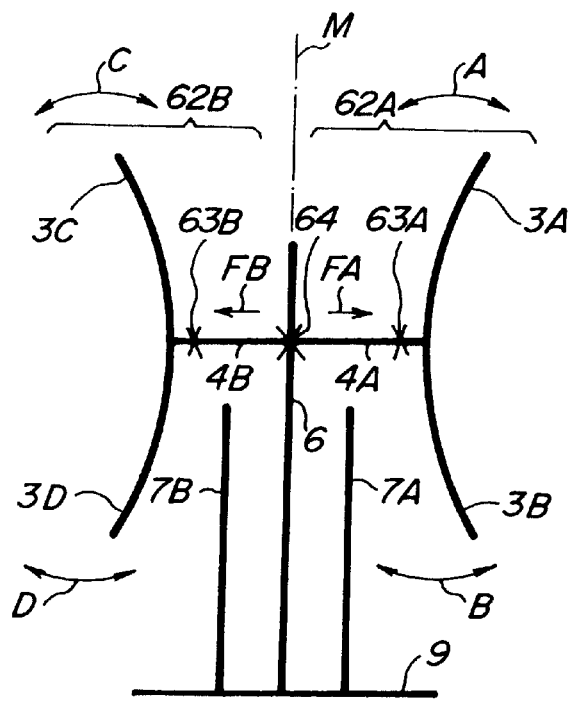
FIG_5b
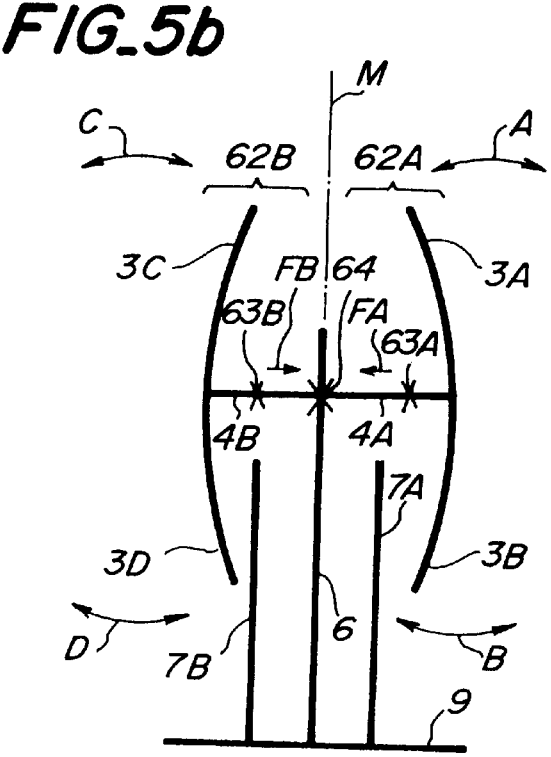

FIG_7

FIG_8

FIG_10
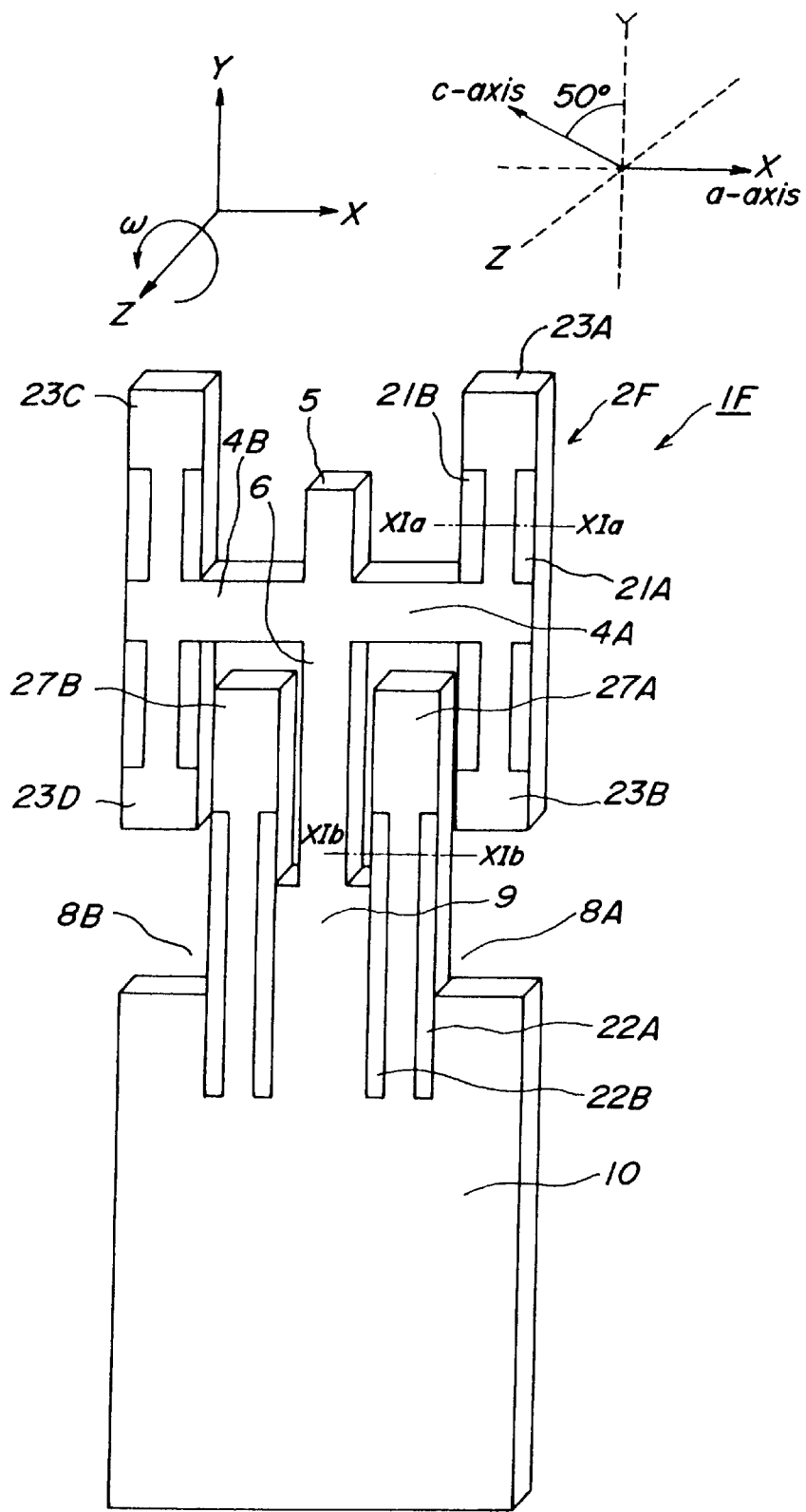

FIG_11a
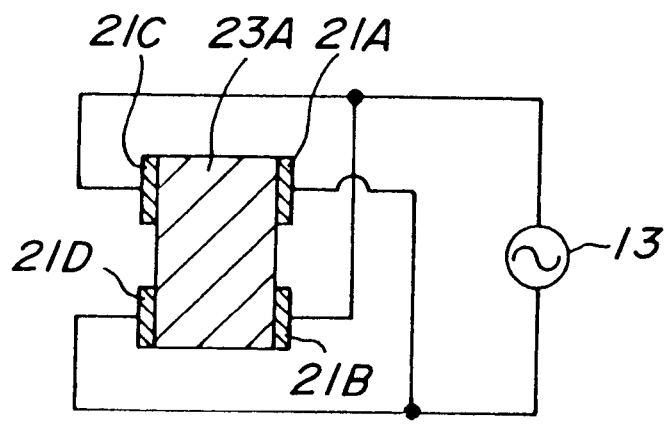
FIG_11b
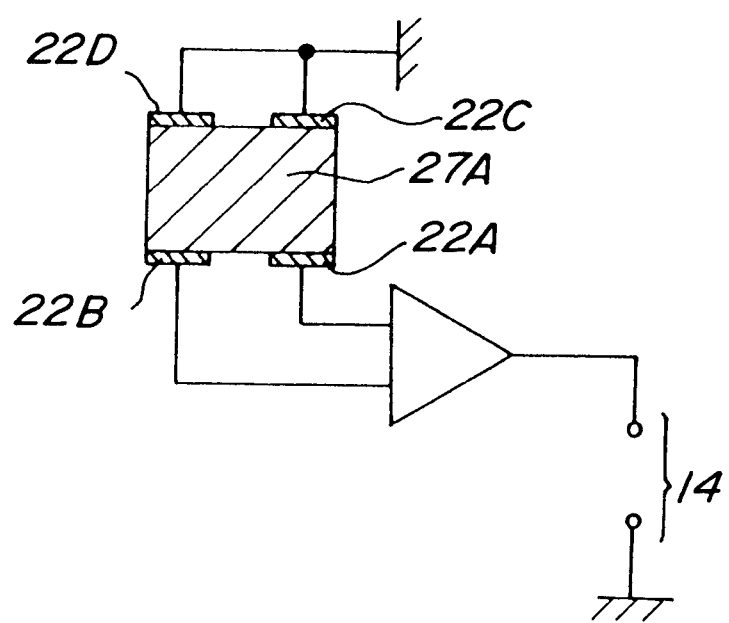

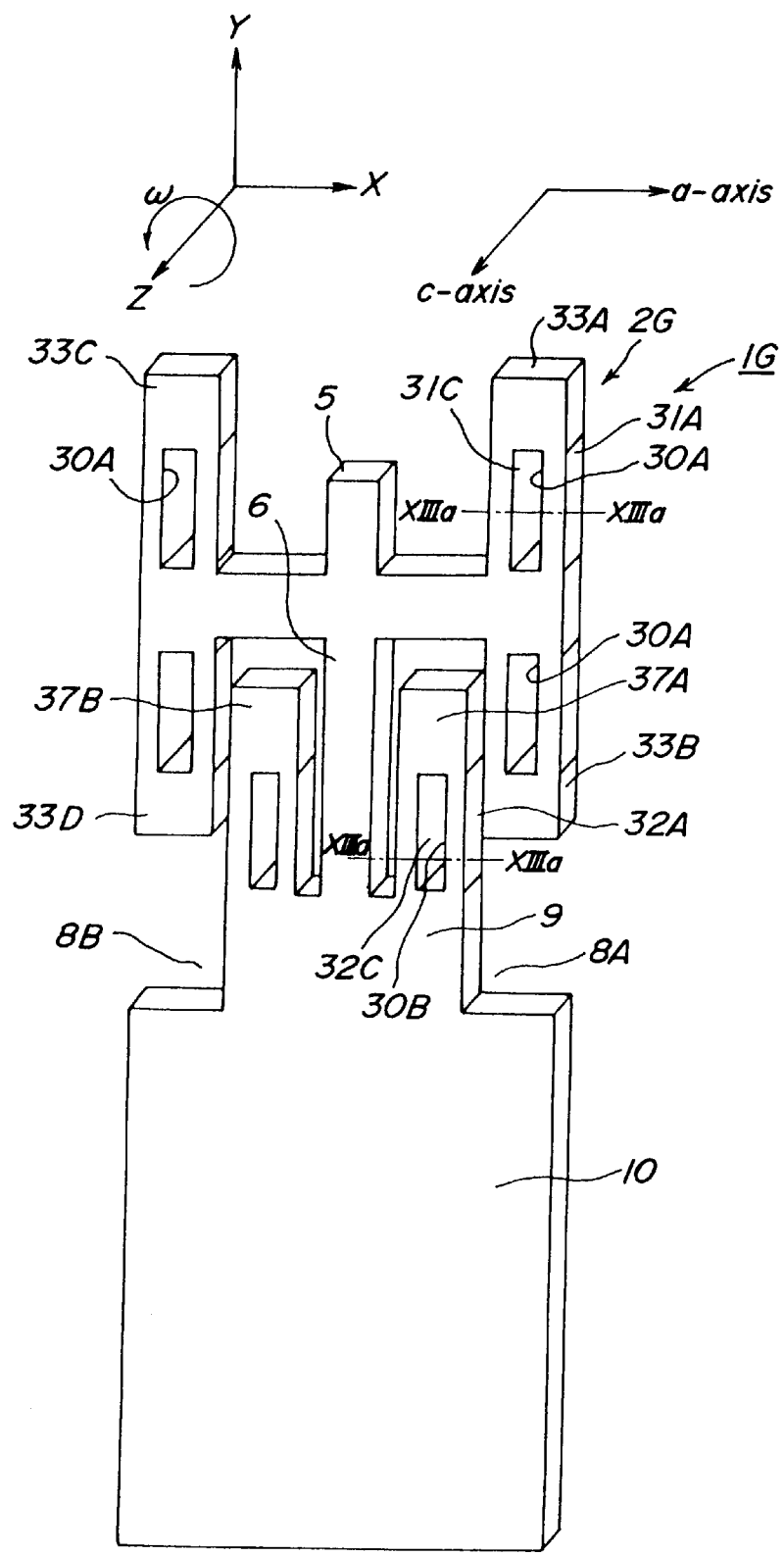
FIG_12

FIG_13a
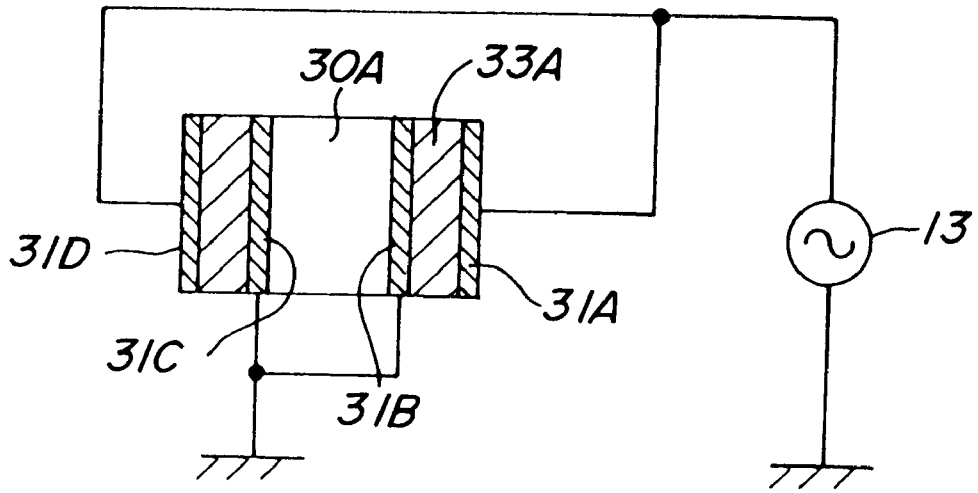
FIG_13b
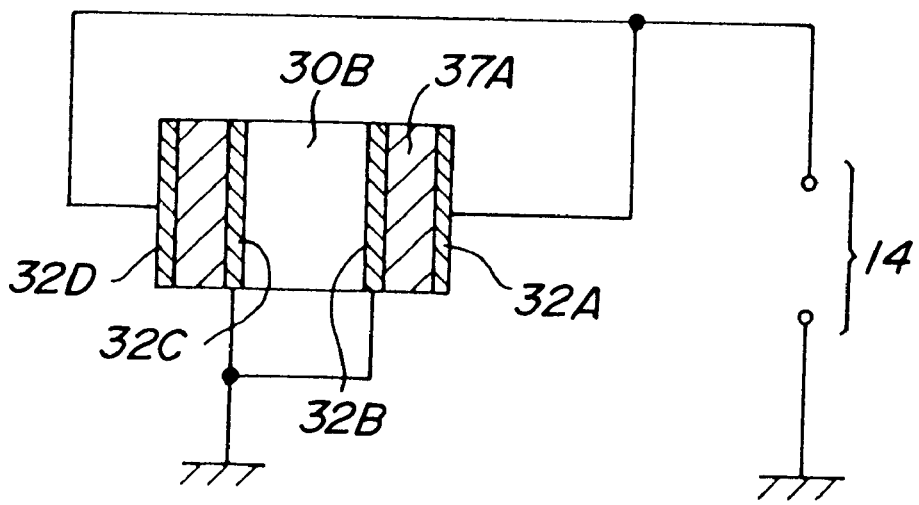

FIG_15a
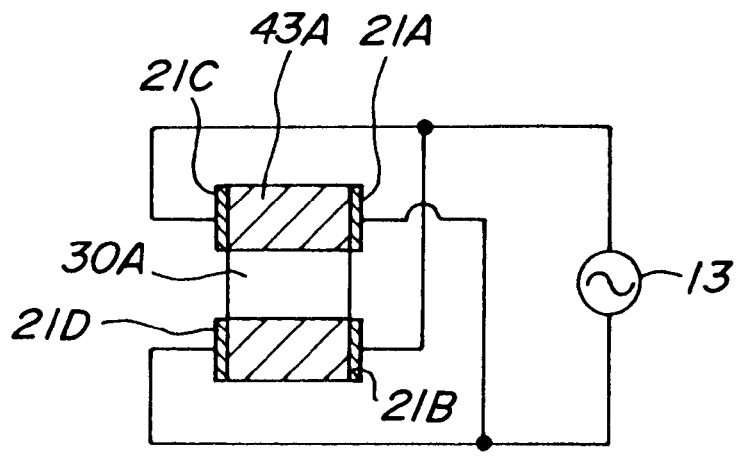
FIG_15b
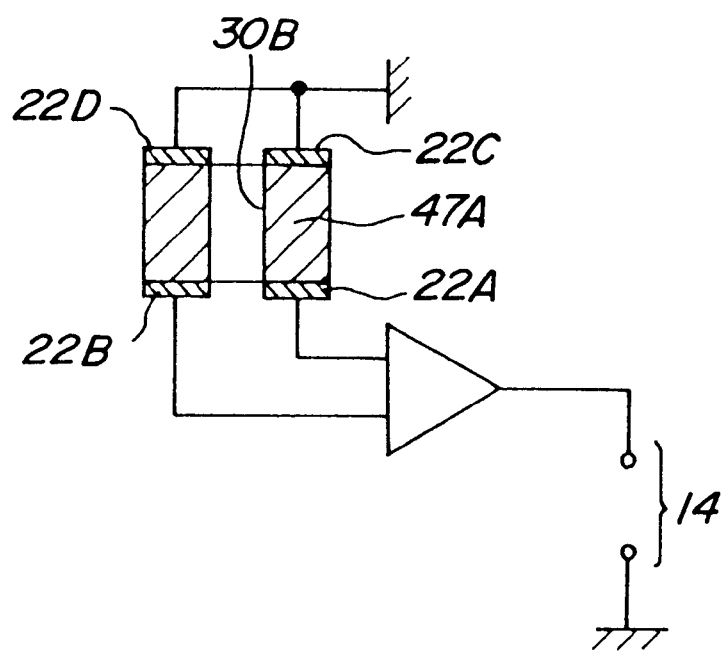

FIG. 19
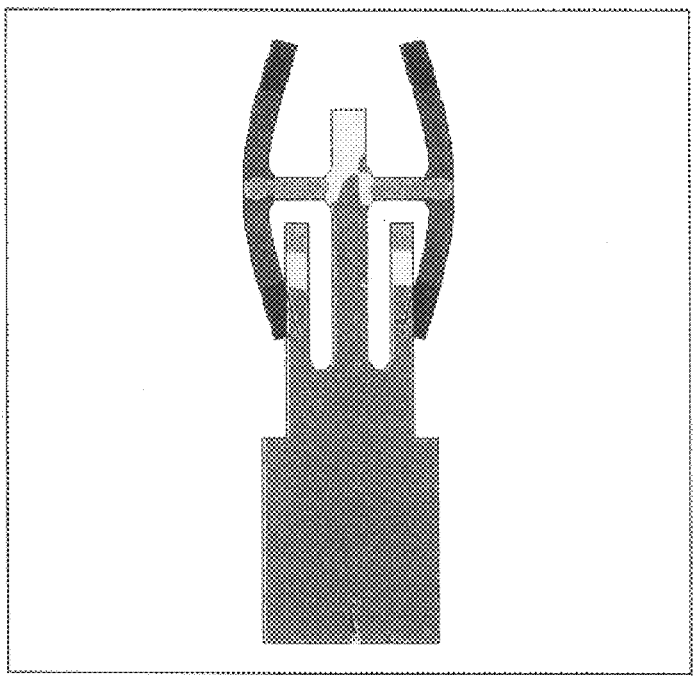
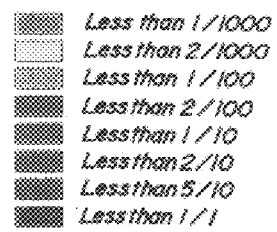
Driving mode
Ratio of amplitude at a domain to amplitude at the maximum vibration amplitude point
- Less than 1/1000
- Less than 2/1000
- Less than 1/100
- Less than 2/100
- Less than 1/10
- Less than 2/10
- Less than 5/10
- Less than 1/1

FIG_23a
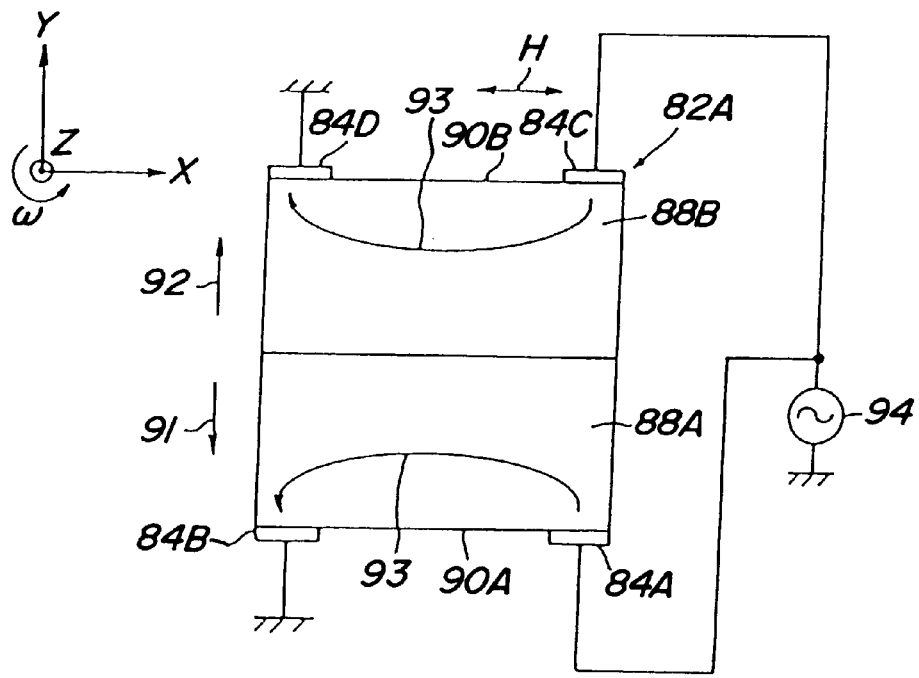
FIG_23b
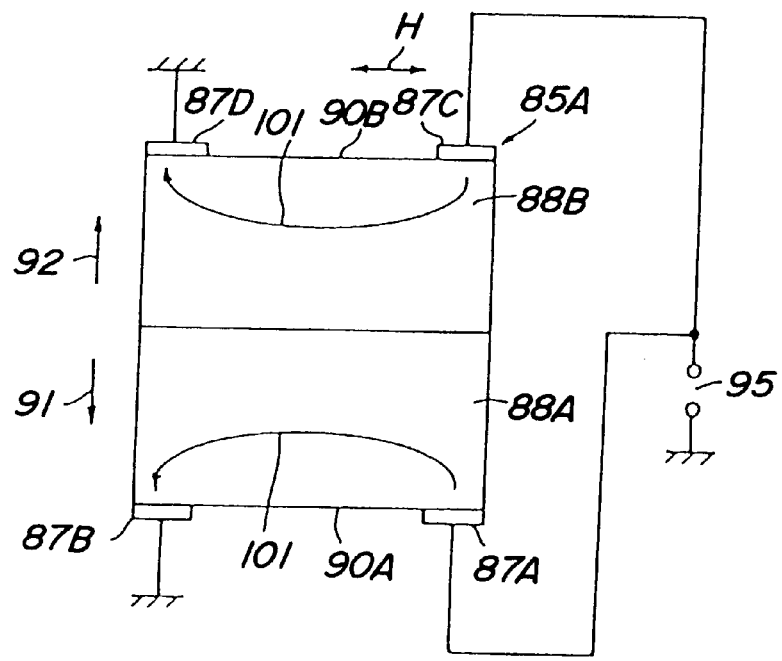

VIBRATOR, VIBRATORY GYROSCOPE, AND LINEAR ACCELEROMETER

BACKGROUND OF THE INVENTION

1. Field of the Invention

The present invention relates to a vibrator used in an angular velocity sensor for detecting a turning angular velocity in a turning system and a vibratory gyroscope using this vibrator.

2. Related Art Statement

Up to now, as an angular velocity sensor used for detecting a turning angular velocity in a rotation system, a vibratory gyroscope using a piezoelectric member has been used for detecting a position of an aircraft, a ship, a space satellite, or the like. Recently, such vibratory gyroscopes are used in car-navigation systems, a fine vibration detecting mechanism for a VTR or a still camera, and the like in the field of people's livelihood.

Such a vibratory gyroscope utilizes the phenomenon that when an angular speed is applied to a vibrating object, a Coriolis force is generated in the direction perpendicular to a vibratory direction. Its mechanism is analyzed by using a dynamic model (for example, "Handbook of Elastic Wave Device Technologies" issued by Ohm, Inc., pp.491 to 497). Various kinds of piezoelectric vibratory gyroscopes have been proposed up to now. For example, a Sperry tuning-fork gyroscope, a Watson tuning-fork gyroscope, a regular-triangular section prism-shaped tuning-piece gyroscope, a cylindrical tuning-piece gyroscope, and the like are known as a piezoelectric vibratory gyroscope.

The inventors are studying various applications of vibratory gyroscopes, and have studied using a vibratory gyroscope as a turning angular velocity sensor to be employed in a car control method of an automobile body based on a vehicle turning velocity feedback system, for example. Such a system detects the direction of a steering wheel itself by a turning angle of the steering wheel. Simultaneously, the turning velocity at which the car vehicle actual turns is detected by the vibratory gyroscope. The system finds a difference by comparing the direction of the steering wheel with the actual body turning velocity, and attains a stable vehicle control by correcting a wheel torque and a steering angle on the basis of this difference.

However, any of the above-mentioned former piezoelectric vibratory gyroscopes can detect a turning angular velocity only by arranging a vibrator in parallel with the axis of turning (what is called a vertical arrangement). The turning axis of a rotation system to be measured is usually perpendicular to a gyroscope-mounting portion. Accordingly, in mounting such a piezoelectric vibratory gyroscope it has been impossible to reduce the height of the piezoelectric vibratory gyroscope, namely, to reduce the size of the piezoelectric vibratory gyroscope as viewed in the direction of the turning axis.

In recent years, a piezoelectric vibratory gyroscope capable of detecting a turning angular velocity even when arranging a vibrator perpendicularly to the turning axis (what is called a horizontal arrangement) has been proposed in a Japanese patent application Laid-open No. 8-128833. However, such a vibratory gyroscope also has a limit in reducing its dimension taken along the axis of turning.

A vibratory gyroscope roughly shown in FIG. 24 was proposed in pp.1071 to 1072 of "Japan Society of Acoustics Engineers '96 Spring Convention Transactions No. 3-9-21 (issued in March 1996)". This vibrator is provided with three arms 50A, 50B and 50C projecting from a fixing part 10, and a weight 51 is formed on the top end of each of the arms 50A and 50C at both sides. The arms 50A and 50C at both sides are bending-vibrated reversely in phase to each other around the fixing part 10 as shown by arrows H. When the whole vibrator is turned in the paper face plane as shown by arrow ω, a bending vibration is generated by a Coriolis force applied to the weight 51, and this bending vibration is detected by electrodes provided at the root of the middle arm 50B. This vibratory gyroscope uses a vibrator which utilizes a three-forked tuning fork high in vibration efficiency and is not projected outside a specified plane, and moreover makes it possible to detect a turning angular velocity in the specified plane.

The inventors have proposed a vibratory gyroscope as shown in FIGS. 25(a) and 25(b) in the specification of a Japanese patent application No. 8-317781. In this vibrator 54, a slender base part 57 extends from a fixing part 10, and detection electrodes 58A and 58B are formed on the base part 57. A pair of bending-vibration pieces 56A and 56B are provided on the top end of the base part 57, and drive electrodes 55A, 55B, 55C and 55D are provided, respectively, on the bending-vibration pieces 56A and 56B. When the bending-vibration pieces are bending-vibrated respectively as shown by arrows I and the whole vibrator is turned, the base part 57 is bending-vibrated by a Coriolis force as shown by an arrow J. This vibration is detected by the detection electrodes 58A and 58B.

In these vibratory gyroscopes, however, it has also been found that the following problems still remain. That is to say, in the vibratory gyroscope shown in FIG. 24, base parts 52 and 53 of the respective arms are locally vibrated as extending and contracting by driving vibrations of the arms 50A and 50C. Since the resonance frequency of this extending-contracting vibration is close to the resonance frequency of a detection vibration of the arm 50B, this extending-contracting vibration causes great noises in a detection signal.

In the vibratory gyroscope shown in FIGS. 25(a) and (b), as shown in FIG. 25(b), when the bending-vibration pieces 56A and 56B are vibrated, for example, as shown by arrows I, stress is applied to the root 59 of the base part 57 as shown by an arrow K. As a result of bending-vibrations of the bending-vibration pieces 56A and 56B, therefore, an extending-contracting vibration is generated at the root of the base part, namely, at a place where the detection electrodes exist, and this extending-contracting vibration causes noises.

SUMMARY OF THE INVENTION

An object of the present invention is to provide a new vibratory gyroscope capable of detecting a turning angular velocity of the vibrator particularly when a vibrator extending in a specified plane is turned in this specified plane.

Another object of the invention is to make it possible to prevent the phenomenon that in a vibratory gyroscope utilizing a bending vibration of a vibrator extending in a specified plane, an extending-contracting vibration is generated in a detecting part of a vibrator according to a driving vibration of the vibrator to cause noises in a detection signal.

The vibrator according to the invention comprises a base part at least one of whose ends is fixed, a first leg extending in a direction crossing this base part, a second leg extending in a direction crossing the base part and being opposite to the first leg with respect to the base part, a first bending-vibration piece extending in a direction crossing the first leg, a second bending-vibration piece extending in a direction crossing the second leg and being opposite to the first bending-vibration piece with respect to the first leg, a third bending-vibration piece extending in a direction crossing the second leg, and a fourth bending-vibration piece extending in a direction crossing the second leg and being opposite to the third bending-vibration piece with respect to the second leg.

The vibratory gyroscope for detecting a turning angular velocity according to the invention, comprises the vibrator, an exciting means for casing vibration to the vibrator in a specified plane, and a detecting means for detecting a bending vibration of the vibrator generated by a Coriolis force applied to the vibrator when the vibrator is turned in the specified plane and outputting a signal according to the bending vibration.

According to the invention, a driving vibration of a vibrator and a detection vibration are generated in a specified plane, and a bending vibration can be used as vibration to be detected. Accordingly to this, the invention can detect a turning angular velocity at a sufficiently high sensitivity without providing a projection of a certain weight projecting from the vibrator in the direction of the axis of turning, in case of setting up the vibrator so that vibration arms of the vibrator extend perpendicularly to the axis of turning.

Moreover, in case that extending-contracting vibrations are generated in the legs by vibration of the bending-vibration pieces, since these extending-contracting vibrations are nearly symmetrical to each other with the base part as the axis of symmetry, they offset each other. Accordingly, when a turning angular velocity is zero, an extending-contracting vibration of the base part can be prevented from being caused by the bending-vibration pieces and a detection signal noise caused by such an extending-contracting vibration can be suppressed or prevented. Such a vibratory gyroscope and its vibrator solve a fundamental problem in a vibrator.

In a vibrator of the invention, as shown in FIGS. 4(a) and 4(b) for example, it is preferable that vibration A of a first bending-vibration piece 3A and vibration B of a second bending-vibration piece 3B are symmetrical in phase to each other with respect to a first leg 4A, and vibration C of a third bending-vibration piece 3C and vibration D of a fourth bending-vibration piece 3D are symmetrical in phase to each other with respect to a second leg 4B. Accordingly, the legs 4A and 4B are subjected to bending-vibrations.

As shown in FIGS. 4(a) and 4(b), it is particularly preferable that the center of gravity 61A in vibration of the whole vibration system 60A composed of the first bending-vibration piece 3A and the second bending-vibration piece 3B is on the first leg 4A or on its extension line G, whereas the center of gravity 61B in vibration of the whole vibration system 60B composed of the third bending-vibration piece 3C and the fourth bending-vibration piece 3D is on the second leg 4B or on its extension line G. Thanks to this, when a driving vibration is generated, the legs 4A or 4B are not bending-vibrated and accordingly a bending vibration is not generated in the base part 6 by such bending vibration.

As shown in FIG. 5(a) and 5(b), the center of gravity 63A in vibration of the whole vibration system 62A composed of the first leg 4A, the first bending-vibration piece 3A and the second bending-vibration piece 3B is vibrated with vibration of the bending-vibration pieces 3A and 3B. In the same way, the center of gravity 63B in vibration of the whole vibration system 62B composed of the second leg 4B, the third bending-vibration piece 3C and the fourth bending-vibration piece 3D is vibrated with vibration of the bending-vibration pieces 3C and 3D. At this time, it is preferable that the vibration of the center of gravity 63A and the vibration of the center of gravity 63B are symmetrical in phase to each other with respect to the base part 6. Accordingly, the stresses applied to the base part 6 from the vibration systems 62A and 62B to offset each other.

In this case, it is particularly preferable that a vibrator is designed so that the stress FA applied to the base part 6 by vibration of the whole vibration system 62A composed of the first leg 4A, the first bending-vibration piece 3A and the second bending-vibration piece 3B and the stress FB applied to the base part 6 by vibration of the whole vibration system 62B composed of the second leg 4B, the third bending-vibration piece 3C and the fourth bending-vibration piece 3D can cancel each other in the base part 6. Thereby, noises caused by a bending vibration of the base part 6 can be prevented.

Particularly, it is preferable that the center of gravity 64A in vibration of the whole vibration system composed of the first leg 4A, the first bending-vibration piece 3A, the second bending-vibration piece 3B, the second leg 4B, the third bending-vibration piece 3C and the fourth bending-vibration piece 3D is on the base part 6 or on its extension line M.

With reference to FIGS. 4(a) and 4(b), the invention provides a vibrator comprising a base part 6a at least one of whose ends is fixed, a first leg 4A extending in a direction crossing the base part 6, a second leg 4B extending in a direction crossing the base part 6 and being opposite to the first leg 4A with respect to the base part 6, a first vibration system provided at one side of the first leg 4A, a second vibration system provided at the other side of the first leg 4A, a third vibration system provided at one side of the second leg 4B, and a fourth vibration system provided at the other side of the second leg 4B, wherein vibration of the center of gravity of the first vibration system and vibration of the center of gravity of the second vibration system are symmetrical in phase to each other with respect to the first leg 4A, and vibration of the center of gravity of the third vibration system and vibration of the center of gravity of the fourth vibration system are symmetrical in phase to each other with respect to the second leg 4B.

With reference to FIG. 5(a) and 5(b), the invention provides a vibrator comprising a base part 6a at least one of whose ends is fixed, a first leg 4A extending in a direction crossing the base part 6, a second leg 4B extending in a direction crossing the base part 6 and being opposite to the first leg 4A with respect to the base part 6, a first vibration system provided at one side of the first leg 4A, a second vibration system provided at the other side of the first leg 4A, a third vibration system provided at one side of the second leg 4B, a fourth vibration system provided at the other side of the second leg 4B, wherein vibration of the center of gravity 63 in vibration of the whole vibration system 62A composed of the first leg 4A, the first vibrating system and the second vibrating system is symmetrical in phase to vibration of the center of gravity 63B in vibration of the whole vibration system 62B composed of the second leg 4B, the third vibration system and the second vibration system with respect to the base part 6.

In the preferred embodiments of the invention, the first vibration system is a first bending-vibration piece 3A extending in a direction crossing the first leg, a second bending-vibration piece 3B extending in a direction crossing the first leg and being opposite to the first bending-vibration piece with respect to the first leg, the third vibration system is a third bending-vibration piece 3C extending in a direction crossing the second leg, and the fourth vibration system is a fourth bending-vibration piece 3D extending in a direction crossing the second leg and being opposite to the third bending-vibration piece with respect to the second leg.

BRIEF DESCRIPTION OF THE DRAWINGS

FIG. 1 is a perspective view roughly showing a vibratory gyroscope 1A of an embodiment of the present invention.

FIG. 2(a) is a sectional view showing arrangement of drive electrodes of bending-vibration pieces, and FIG. 2(b) is a sectional view showing arrangement of detection electrodes of resonant arms.

FIG. 3(a) is a diagram showing a driving vibration of a vibrator 2A, FIG. 3(b) is a diagram showing an example of a detection vibration of the vibrator 2A, and FIG. 3(c) is a diagram showing a spurious mode vibration of it.

FIGS. 4(a) and 4(b) are schematic diagrams for explaining states of vibrations of the centers of gravity 61A and 61B of vibration systems 60A and 60B.

FIGS. 5(a) and 5(b) are schematic diagrams for explaining states of vibrations of the centers of gravity 63A and 63B of vibrating systems 62A and 62B, and a state of an extending-contracting stress applied to a base part 6A.

FIG. 10 is a perspective view roughly showing a vibratory gyroscope 1F of a still further other embodiment of the invention.

FIG. 11(a) is a circuit diagram showing arrangement of drive electrodes on a bending-vibration piece in the vibratory gyroscope of FIG. and FIG. 11(b) is a circuit diagram showing arrangement of detection electrodes on a resonant arm.

FIG. 12 is a perspective view roughly showing a vibratory gyroscope 1G of a still other embodiment of the invention, wherein a through hole is formed in each of bending-vibration pieces and resonant arms.

FIG. 13(a) is a sectional view showing arrangement of drive electrodes on a bending-vibration piece in the vibratory gyroscope of FIG. 12, and FIG. 13(b) is a sectional view showing arrangement of detection electrodes on a resonant arm.

FIG. 15(a) is a sectional view showing arrangement of drive electrodes on a bending-vibration piece in the vibratory gyroscope of FIG. 14, and FIG. 15(b) is a sectional view showing arrangement of detection electrodes on a resonant arm.

FIG. 19 is a relative ratio of a maximum vibration amplitude at a driving vibration mode at each point of the vibrator.

FIG. 23(a) is a sectional view of FIG. 22 taken along a line XXIII(a)—XXIII(a) for explaining a way of generating driving vibration of each of bending-vibrating pieces of the vibrator in FIG. 22, and FIGS. 23(b) is a sectional view of FIG. 22 taken along a line XXIII(b)—XXIII(b) for explaining a way of detecting detection vibration in each of resonant arms of the vibrator of FIG. 22.

DESCRIPTION OF THE PREFERRED EMBODIMENTS

Figure 6:
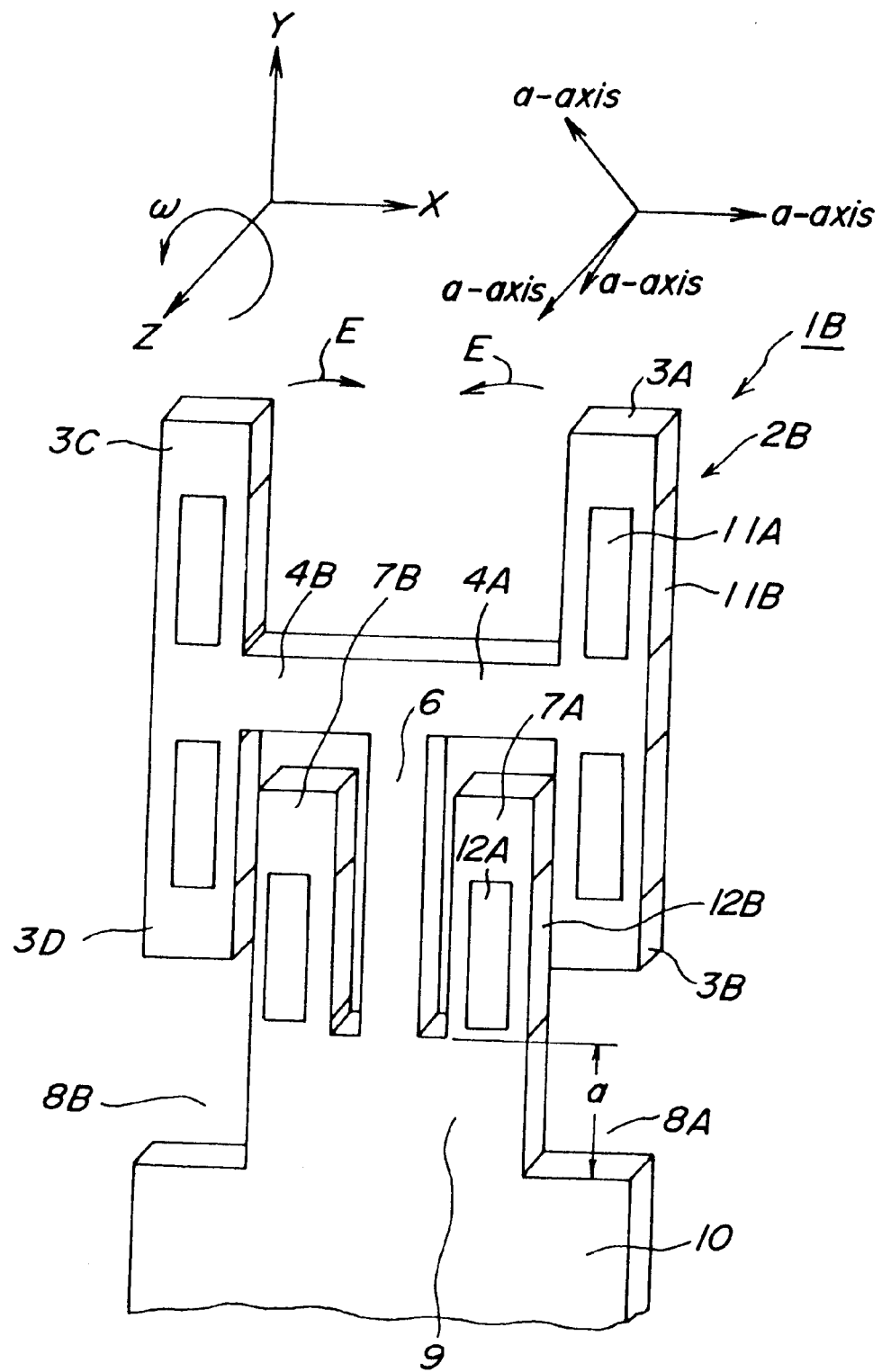
FIG. 6 is a perspective view roughly showing a vibratory gyroscope 1B of another embodiment of the invention, wherein there is not a projection 5.

Displacement of a vibrator of the present invention takes place in a specified plane. Accordingly, the whole vibrator can be formed of the same piezoelectric single crystal. In this case, the vibrator can be formed by first making a thin plate of a piezoelectric single crystal and then processing this thin plate by means of etching or grinding.

Although various parts of the vibrator can be also formed of separate members, it is particularly preferable that they are integrally formed. Although a material for the vibrator is not limited to a specific one, it is preferable to use a single crystal of quartz, $LiNbO_3$, $LiTaO_3$, a solid solution of lithium niobate-lithium tantalate ($Li(Nb, Ta)O_3$ or the like. By using such a single crystal, it is possible to improve a detection sensitivity and reduce a detection noise.

Moreover, by using the piezoelectric single crystal, a vibrator particularly insensitive to a temperature change can be made. Such a vibrator is suitable for a sensor to be mounted in a car, said sensor requiring a thermal stability. This point will be further described.

As an angular velocity sensor using a tuning-fork vibrator there is, for example, a piezoelectric vibratory gyroscope disclosed in the above-mentioned Japanese patent application Laid-open No. 8-128833. However, such a vibrator vibrates in two directions. Therefore, particularly in case of forming the vibrator out of such a single crystal as described above, it is necessary to match characteristics in the two directions of the single crystal with each other. In practice, however, a piezoelectric single crystal is anisotropic.

Generally in the piezoelectric vibratory gyroscope, in order to realize a good measuring sensitivity, it is required to keep a given vibration frequency difference between the natural resonance frequency of a driving vibration mode and that of a detection vibration mode. However, since the single crystal is anisotropic, a degree of variation in vibration frequency caused by a temperature change varies with the crystal face. For example, although variation in vibration frequency caused by a temperature change is very little in case of cutting a single crystal along a specific crystal face, variation in vibration frequency is very sensitive to a temperature change in case of cutting the single crystal along another crystal face. Thus, when the vibrator vibrates in two directions, at least one of the two vibrating faces is a crystal face having a large variation in vibration frequency caused by a temperature change.

On the other hand, as shown in the invention, when the whole vibrator vibrates in a specified plane and the vibrator is formed of a piezoelectric single crystal, it is possible to use only the best crystal face in temperature characteristics of the single crystal in the vibrator.

That is to say, since the whole vibrator is designed so as to vibrate in a specified plane, it is possible to manufacture a vibrator by using only that crystal face having little variation in vibration frequency caused by a temperature change, of a piezoelectric single crystal. Therefore, it is possible to provide a vibratory gyroscope having a very high thermal stability.

Among the above-mentioned single crystals, a single crystal of LiNbO$_3$, a single crystal of LiTaO$_3$, and a single crystal of a solid solution of lithium niobate-lithium tantalate have particularly large electromechanical coupling coefficients. Comparing a single crystal of LiNbO$_3$ and a single crystal of LiTaO$_3$ with each other, the single crystal of LiTaO$_3$ has a larger electromechanical coupling coefficient and a better thermal stability than the single crystal of LiNbO$_3$.

In case of forming a vibrator of the invention out of a piezoelectric material such as a piezoelectric single crystal or the like, the vibrator is provided with drive electrodes and detection electrodes. In case of forming the vibrator of the invention of a piezoelectric ceramic material such as a piezoelectric single crystal or a piezoelectric ceramics such as PZT, the vibrator is provided with drive electrodes and detection electrodes.

A vibrator of the invention can be also formed of an invariable-elasticity metal such as elinvar or the like. In this case, it is necessary to provide the vibrator with piezoelectric members at specified positions.

In a vibrator of the invention, although the longitudinal direction of the base part and that of the legs are not necessarily perpendicular to each other, it is preferable that they are perpendicular to each other. Further, although the longitudinal direction of the leg and that of the bending-vibration pieces are not necessarily perpendicular to each other, it is preferable that they are perpendicular to each other.

FIG. 1 is a perspective view roughly showing a vibratory gyroscope 1A of an embodiment of the present invention. In a vibrator 2A, a base part 6 and a pair of resonant arms 7A and 7B extend from a projection part 9 of a fixing part 10 in parallel with one another. A first leg 4A and a second leg 4B extend from the top end of the base part 6, perpendicularly to the base part 6. A projection part 5 projects in a direction opposite to the base part 6 from an intersecting part where the first leg 4A and the second leg 4B are joined with the base part 6. A first bending-vibration piece 3A and a second bending-vibration piece 3B extend in directions perpendicular to the first leg 4A and opposite to each other at the top end of the first leg 4A. A third bending-vibration piece 3C and a fourth bending-vibration piece 3D extend in directions perpendicularly to the second leg 4B and opposite to each other at the top end of the second leg 4B.

Although a drive method and a detection method in the respective bending-vibration pieces are not specifically limited, this embodiment uses drive electrodes and detection electrodes having a construction as shown in FIGS. 2(a) and 2(b). In this case, the vibrator is formed of a piezoelectric single crystal having the triad axis of symmetry (a-axis) in a specific plane like a quartz crystal, in which a c-axis of the piezoelectric single crystal is perpendicular to the specified plane. In this embodiment, it is preferable that a voltage applying direction in each of the bending-vibration pieces and a signal voltage direction in each of the resonant arms are directed to the a-axis.

Accordingly, in the bending-vibration pieces 3A and 3C (3B and 3D), as shown in FIG. 2(a), a high-frequency voltage can be applied in the a-axis direction by connecting one of drive electrodes 11A and 11B to a high-frequency power source and grounding the other. In the resonant arms 7A and 7B, as shown in FIG. 2(b), a signal voltage generated in the a-axis direction can be detected by grounding a detection electrode 12B and connecting a detection electrode 12A to a detection part 14.

FIG. 3(a) is a diagram showing a driving vibration of the vibrator 2A. Here, the bending-vibration pieces 3A, 3B, 3C and 3D are bending-vibrated as shown by arrows A, B, C and D. At this time, since the first bending-vibration piece 3A and the second bending-vibration piece 3B are symmetrical in vibration to each other with respect to the leg 4A, a bending vibration is not generated in the leg 4A. However, an extending-contracting vibration is generated in the leg 4A in its longitudinal direction. In the same way, since the third bending-vibration piece 3C and the fourth bending-vibration piece 3D are symmetrical in vibration to each other with respect to the leg 4B, a bending vibration is not generated in the leg 4B, and an extending-contracting vibration only is generated in the leg 4B in its longitudinal direction. As the result, the base part 6 is influenced by no bending-vibrations of the legs 4a and 4B, and furthermore, even when the legs are vibrated by their extension and contraction. Since the extending-contracting vibrations are symmetrical to each other with respect to the base part 6, their influences are almost negligibly small.

FIG. 3(b) is a diagram showing a detection vibration of the vibrator 2A. In this vibration, the bending-vibration pieces 3A and 3C, and the bending-vibration pieces 3B and 3D are vibrated reversely in direction to each other according to Coriolis forces applied to the respective bending-vibration pieces. Due to asymmetry of these vibrations, the base part 6 is vibrated and the resonant arms 7A and 7B are vibrated reversely in phase to the vibration of the base part 6. These vibrations are detected in amplitude by the detection electrodes 12A and 12B provided on the resonant arms 7A and 7B. In FIG. 3(b), a reference number 15 shows the shape of the vibrator in a stationary state.

In the invention, as described later, detection electrodes can be provided on the base part without using the resonant arms. However, it is possible to particularly make less damping of the detection vibration and thereby greatly improve the Q value by projecting at least one pair of resonant arms together with a base part from a fixing part and resonating the resonant arms with the vibration of the base part.

This embodiment varies the natural resonance frequency of a so-called spurious mode vibration by making both sides of each of the resonant arms 7A and 7B different in projecting height from each other as viewed from the fixing parts 9, 10. That is to say, cut-off parts 8A and 8B of "a" in depth are formed at thanks to outer sides of the resonant arms 7A and 7B, and thanks to the projection part 9 of "a" in height is measured from the fixing part 10 is formed. As a result, it is possible to make distant the natural resonance frequency of the spurious mode vibration from that of a driving vibration.

Usually, if a frequency difference between the natural resonance frequency of a driving vibration shown in FIG. 3(a) and that of a spurious mode vibration shown in FIG. 3(c) becomes 50 Hz or less, a signal generated by an in-phase vibration (a spurious mode vibration) in the resonant arms becomes much larger than a detection signal.

However, with increase in the dimension "a" in FIG. 1, the natural resonance frequency of the spurious mode vibration greatly varies and is deviated from the natural resonance frequency of the driving vibration. Particularly, by making dimension a equal to or more than one tenth of the length of the arm, it has been possible to greatly deviate the natural resonance frequency of the spurious mode vibration from that of the driving vibration.

In such a way, making the projection heights of both sides of each of the resonant arms different in height from each other as projected from the fixing part is effective to reduce noises caused by the spurious mode vibration. For this purpose, it is particularly preferable to make the dimension "a" equal to or more than one tenth of the length of the arm. Further, this is preferably 9/10 or less of the length of the arm.

FIGS. 4 and 5 both are Figures for explaining vibration modes of the respective vibration systems, and were explained above.

Figure 7:
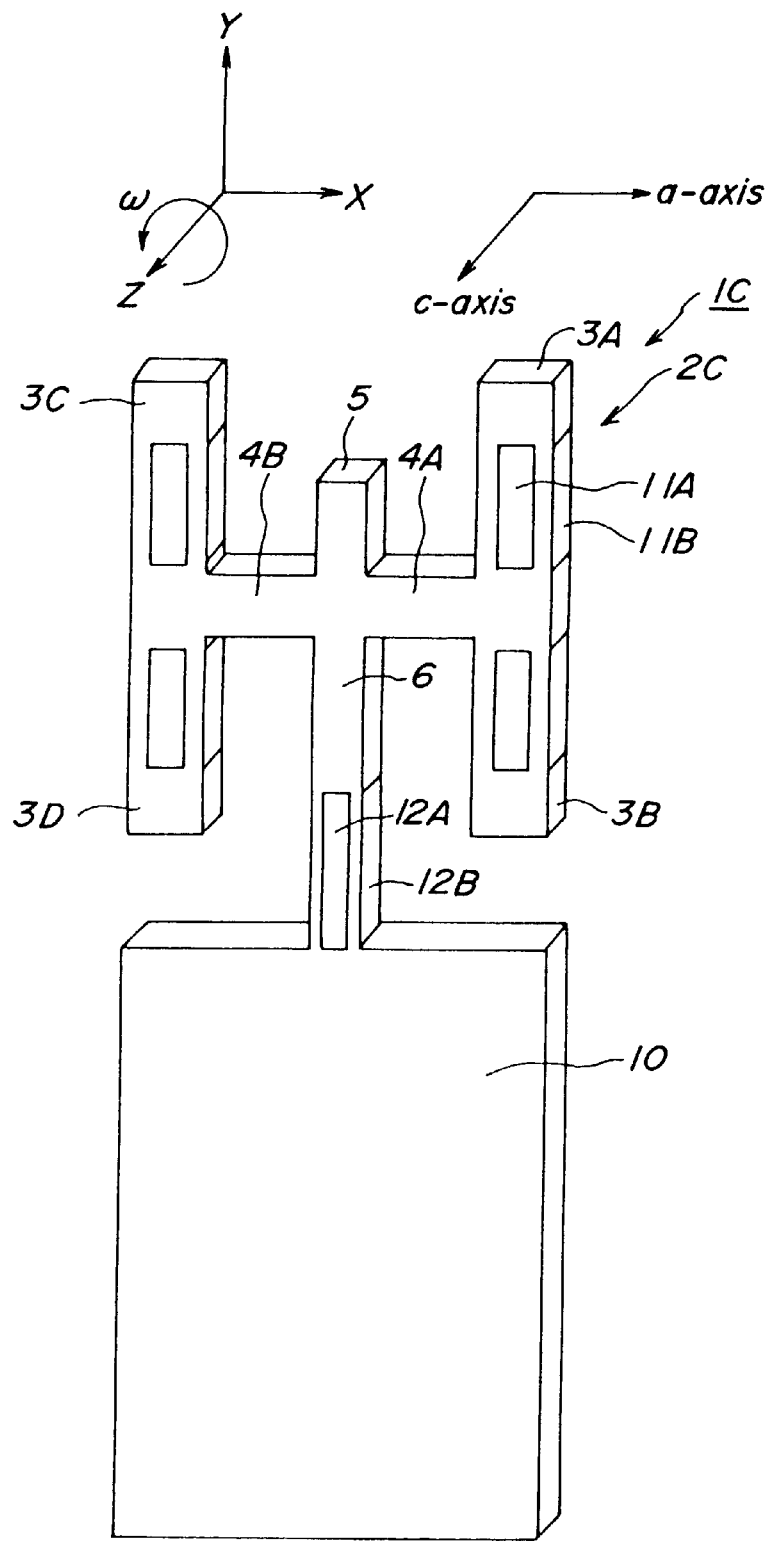
FIG. 7 is a perspective view roughly showing a vibratory gyroscope 1C of a further other embodiment of the invention, wherein there is no resonant arm.

FIGS. 6 and 7 both are perspective views roughly showing vibratory gyroscopes of the invention. In FIGS. 6 and 7, the same symbols are given to the same components as those shown in FIG. 1, and description of them is omitted.

A vibrator 2B of a vibratory gyroscope 1B of FIG. 6 is not provided with a projection part 5 shown in FIG. 1. A drive method and a detection method in it are the same as the vibratory gyroscope shown in FIG. 1. Such a vibratory gyroscope can also exhibit an effect of the invention. In this example, since no projection part exists at the upside of the legs 4A and 4B while the base part 6 exists at the downside of the legs, a stress distribution in the whole vibrator in a driving vibration is asymmetrical with the legs 4A and 4B. Due to this, the amplitude in vibration of the bending-vibration pieces 3A and 3B and that of the bending-vibration pieces 3C and 3D tend to increase in a direction toward a location where no base portion exists. Namely the bending-vibration pieces 3A–3D tend to greatly vibrate in directions shown by arrows E.

This is liable to appear as an extending-contracting vibration of the base part 6.

As shown in FIG. 1, therefore, it is preferable to make driving vibrations of the bending-vibration pieces linearly symmetrical to each other with respect to the legs 4A and 4B by providing the projection on the opposite side of the base part 6. For this purpose, it is particularly preferable to make the length of the projection part 5 one tenth or more of the length of the base part 6.

When the length of the projection part 5 exceeds two thirds of the length of the base part 6, however, a frequency difference between the natural resonance frequency of the driving vibration of the vibrator and that of the detection vibration becomes large and the detection sensitivity trends to be lowered. Accordingly, it is preferable to make the length of the projection part 5 equal to or less than that of the base part 6.

A vibrator 2C of a vibratory gyroscope 1C of FIG. 7 is provided with detection electrodes 12A and 12B at the root of the base part 6 without being provided with resonant arms. Vibration in the base part 6 is directly detected by this.

Figure 8:
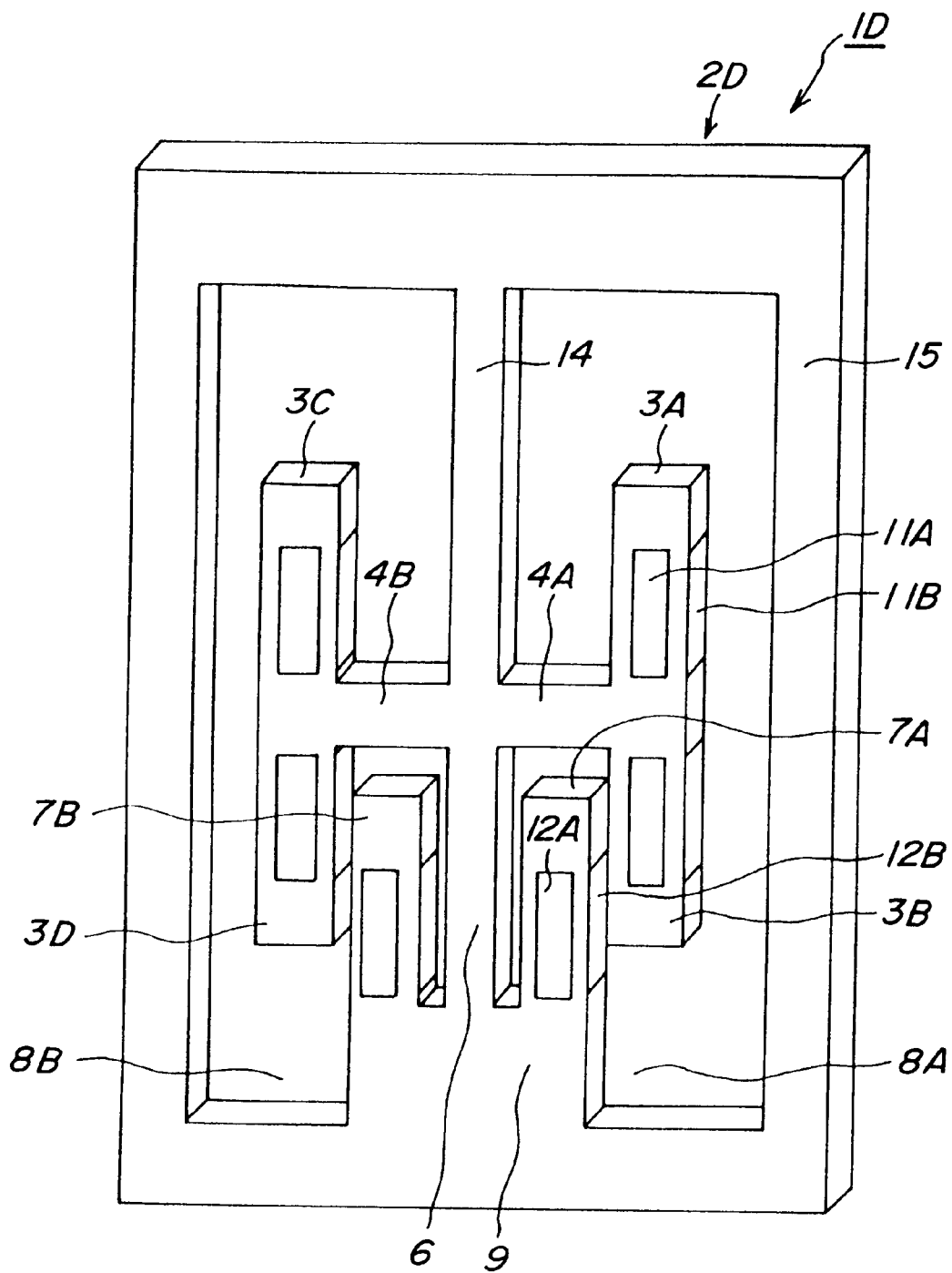
FIG. 8 is a perspective view roughly showing a vibratory gyroscope 1D of a further embodiment of the invention, wherein a base part 6 and a projection 14 are joined with a fixing frame 15.

In a vibrator 2D of a vibratory gyroscope 1D of FIG. 8, a fixing part 9 is provided inside a fixing frame 15 of the whole vibrator, and a base part 6 and a pair of resonant arms 7A and 7B are projected from the fixing part 9. A projection part 14 is provided at the opposite side to the base part 6 with respect to the legs 4A and 4B and this projection part 14 is joined to the inside of the fixing frame 15. As a result, the legs 4A and 4B are constrained by both of the base part 6 and the projection part 14.

This vibratory gyroscope 1D also functions in the same manner as in the vibratory gyroscope 1A of FIG. 1. When the bending-vibration pieces vibrate in a driving vibration mode, however, stress is applied to the legs 4A and 4B in the extending-contracting direction. Strain is liable to be generated in the base part 6 by this stress. On the other hand, as shown in FIG. 1 for example, in case that the projection 5 is not fixed on the fixing frame, strain in the base part 6 caused by the stress in the extending-contracting direction is smaller.

Figure 9:
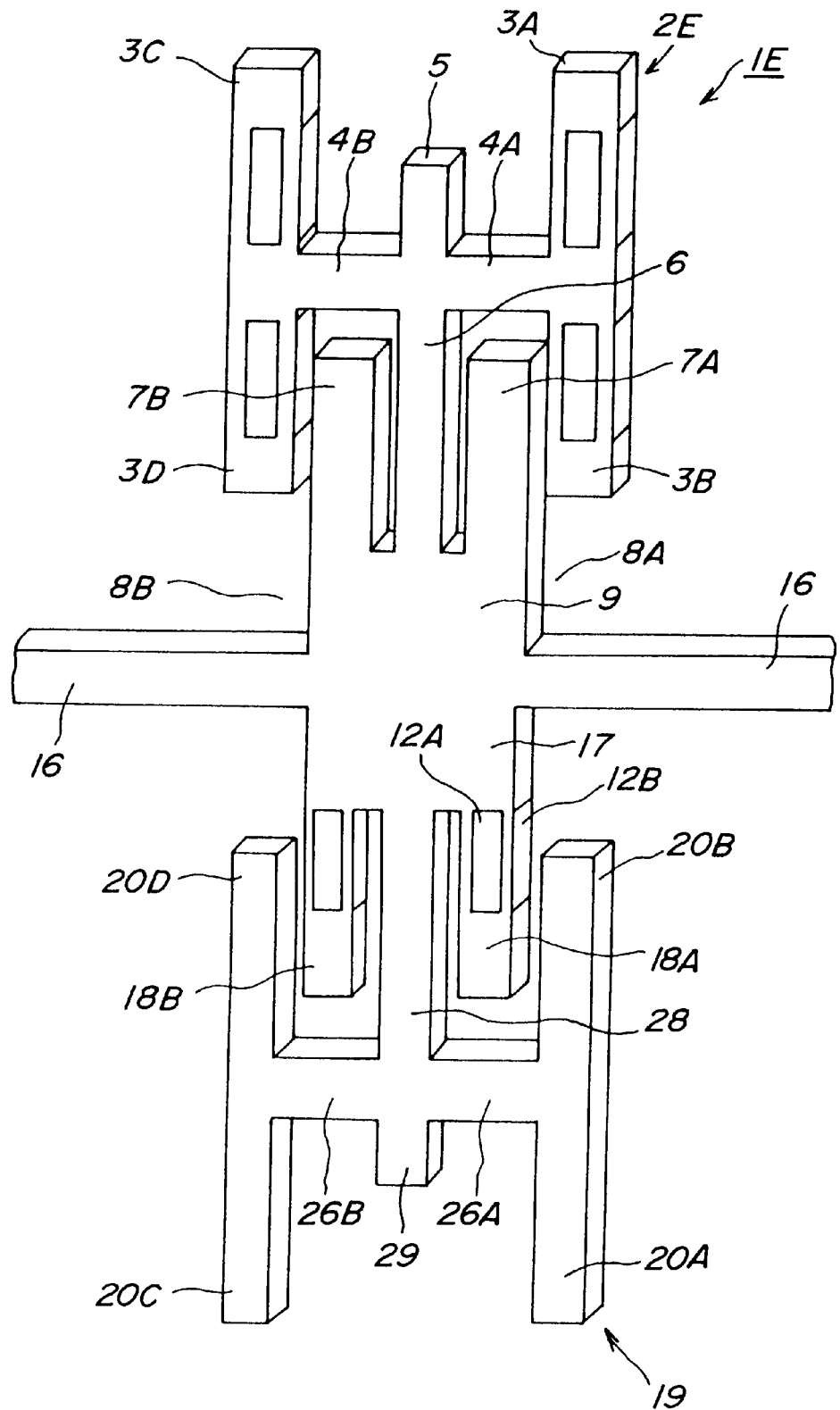
FIG. 9 is a perspective view roughly showing a vibratory gyroscope 1E of other embodiment of the invention, wherein a resonant piece 19 is formed.

In a vibrator 2E of a vibratory gyroscope 1E of FIG. 9, a base part 6 and a pair of resonant arms 7A and 7B project at one side of a fixing piece part 16 which is a fixing part. Further, a resonant piece 19 is provided at the other side of the fixing piece part 16. Both ends of the fixing piece part 16 are continued to a fixing part not shown. The resonant piece 19 of this embodiment is provided with a projection part 17 projecting from the fixing piece part 16, a pair of resonant arms 18A 18B projecting from the projecting part 17, and a base part 28.

A pair of legs 26A and 26B extend from the top end of the base part 28, perpendicularly to the base part 28. A projection part 29 is projected in the opposite direction to the base part 28 at the intersecting part where the legs 26A and 26B are joined. A pair of bending-vibration pieces 20A and 20B extend in directions opposite to each other, perpendicularly to the leg 26A from the top end of the leg 26A. A pair of bending-vibration pieces 20C and 20D extend in directions opposite to each other, perpendicularly to the leg 26B from the top end of the leg 26B.

At the time of driving, the bending-vibration pieces 3A, 3B, 3C and 3D are driven, and the bending-vibration pieces 20A, 20B, 20C and 20D of the resonant piece 19 are resonated with the driving vibration. By turning the whole vibrator 2E in a specified plane, the resonant arms 18A and 18B of the resonant piece 19 are bending-vibrated while the resonant arms 7A and 7B are vibrated as described above. This bending vibration is detected by the detection electrodes 12A and 12B provided on the resonant arms 18A and 18B of the resonant piece 19.

In the above-mentioned embodiments, the arms are driven by applying a voltage in the a-axis direction of the piezoelectric single crystal. On the other hand, for example, in case of a single crystal of lithium niobate, lithium tantalate, or a single crystal of a solid solution of lithium niobate-lithium tantalate, as shown in FIG. 8 for example, it is most advantageous from a viewpoint of thermal stability to orient the a-axis in parallel with the paper face and direct the c-axis at an angle of 50° to the paper face. In this case, the bending-vibration pieces are bending-vibrated by applying a voltage in the direction perpendicular to the paper face. FIGS. 8 and 11 show vibratory gyroscopes according to such embodiments.

A vibrator 2F of a vibratory gyroscope 1F of FIG. 10 is formed of a piezoelectric single crystal plate as described above. A base part 6 and a pair of resonant arms 27A and 27B extend from a projection part 9 of a fixing part 10 in parallel with one another. A first leg 4A and a second leg 4B extend from the top end of the base part 6, perpendicularly to the base part 6. A first bending-vibration piece 23A and a second bending-vibration piece 23B extend in directions opposite to each other at the top end of the first leg 4A, perpendicularly to the first leg 4A. Further, a third bending-vibration piece 23C and a fourth bending-vibration piece 23D extend in directions opposite to each other at the top end of the second leg 4B, perpendicularly to the second leg 4B.

In the bending-vibration pieces, as shown in FIG. 11(*a*), drive electrodes 21A, 21B, 21C and 21D are provided in such a manner that the drive electrodes 21A and 21C are opposite to each other, and the drive electrodes 21B and 21D are opposite to each other. A high-frequency voltage is applied between the drive electrodes 21A and 21C in an opposite direction in which a high-frequency voltage is applied between the drive electrodes 21B and 21D. As a result, the bending-vibration pieces can be bending-vibrated in a specified plane.

In the resonant arms 27A and 27B, as shown in FIG. 11(*b*), detection electrodes 22A, 22B, 22C and 22D are provided in such a manner that the detection electrodes 22A and 22C are opposite to each other, and the detection electrodes 22B and 22D are opposite to each other. The detection electrodes 22C and 22D are grounded, and the detection electrodes 22A and 22B are connected to a detecting part 14.

In this invention, a through hole can be formed in each of the bending-vibration pieces and/or the resonant arms, extending in the longitudinal direction of each of bending-vibration pieces and/or resonant arms. By doing so, it is possible to lower the natural resonance frequency of each of the bending-vibration pieces and/or the resonant arms and further increase the Q value of vibration. FIGS. 12 to 15 show vibratory gyroscopes according to such embodiments.

In a vibrator 2G of a vibratory gyroscope 1G of FIG. 12, a base part 6 and a pair of resonant arms 37A and 37B extend from a projection part 9 of a fixing part 10 in parallel with one another.

A first bending-vibration piece 33A and a second bending-vibration piece 33B extend in directions opposite to each other from the top end of the first leg 4A, perpendicularly to the first leg 4A. Further, a third bending-vibration piece 33C and a fourth bending-vibration piece 33D extend in directions opposite to each other from the top end of the second leg 4B, perpendicularly to the second leg 4B.

In each of the bending-vibration pieces 33A, 33B, 33C and 33D, a through hole 30A is formed, extending in the longitudinal direction. As shown in FIG. 13(*a*), drive electrodes 31A and 31D are provided on the outside walls of the through hole 30A in each bending-vibration piece, and drive electrodes 31B and 31C are provided on the inside walls.

This embodiment uses a piezoelectric single crystal plate having an a-axis of the triad axis of symmetry in a specific plane like a quartz crystal. In each bending-vibration piece, as shown in FIG. 13(*a*), the drive electrodes 31A and 31D on the outside walls are connected to an alternating-current power source 13, and the drive electrodes 31B and 31C on the inside walls are grounded. As a result, since a voltage is applied between the drive electrodes 31A and 3B reversely to a voltage applied between the drive electrodes 31C and 3D, the bending-vibration piece is bent.

In each of the resonant arms 37A and 37B, a through hole 30B is formed, extending in the longitudinal direction of each resonant arm. As shown in FIG. 13(*b*), detection electrodes 32A and 32D are provided on the outside walls of each through hole 30B, and detection electrodes 32B and 32C are provided on the inside walls. In each resonant arm, an electric field generated at the detection electrodes 32A and 32B side is reverse to that of generated at the detection electrodes 32C and 32D side As shown in this embodiment, the bending-vibration piece or the resonant arm can be bent by providing a pair of the drive electrodes on the inside and the outside walls at each of both sides of the through hole in each of the resonant arms and/or the bending-vibration pieces. The detection side also has the same construction as above.

Figure 14:
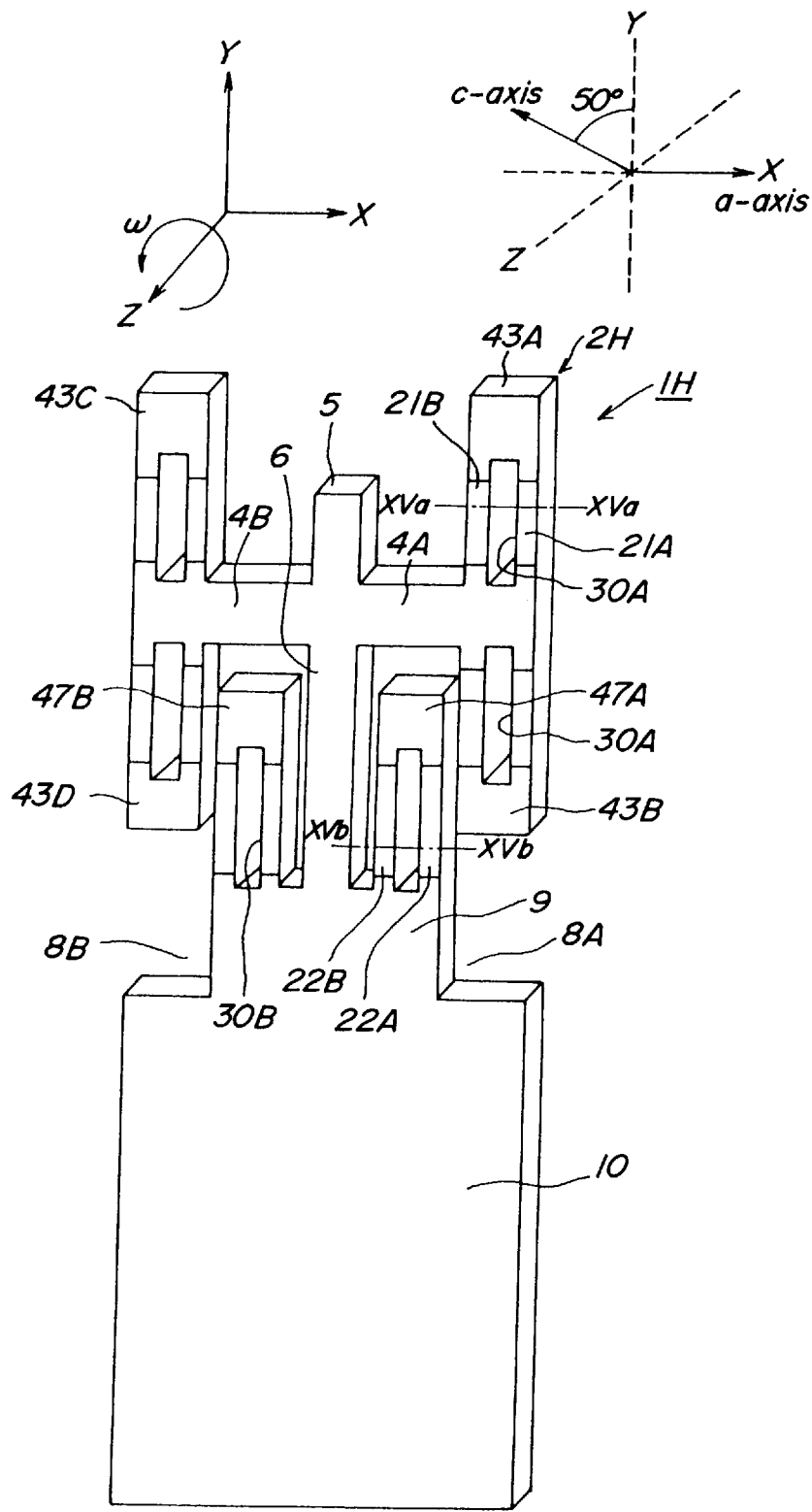
FIG. 14 is a perspective view roughly showing a vibratory gyroscope 1H of still other embodiment of the invention, wherein a through hole is formed in each of bending-vibration pieces and resonant arms.

In a vibrator 2H of a vibratory gyroscope 1H of FIG. 14, a base part 6 and a pair of resonant arms 47A and 47B extend from a projection part 9 of a fixing part 10 in parallel with one another. A first bending-vibration piece 43A and a second bending-vibration piece 43B extend from the top end of the first leg 4A, and a third bending-vibration piece 43C and a fourth bending-vibration piece 43D extend from the top end of the second leg 4B.

This embodiment uses a 130° Y plate of lithium tantalate, in which the c-axis forms an angle of 50° to the main face of the vibrator. Thermal stability of the vibrator becomes best at this angle. In each of the bending-vibration pieces, a through hole 30A is formed, extending in a longitudinal direction. As shown in FIG. 15(*a*), since a voltage is applied between the drive electrodes 21A and 21C reversely in phase to a voltage applied between the drive electrodes 21B and 21D, the bending-vibration piece is bent.

In each of the resonant arms 47A and 47B, a through hole 30B is formed, extending in the longitudinal direction. As shown in FIG. 15(*b*), slender detection electrodes 22A, 22B, 22C and 22D are provided at both sides of each through hole 30B. An electric field is generated between the detection electrodes 22A and 22C reversely to an electric field generated between the detection electrodes 22B and 22D.

In case of forming a vibrator of a planar material of a piezoelectric single crystal, for example quartz by an etching process, a projection of a specific shape, for example, a slender projection is sometimes formed. In this case, it is possible to adjust the vibrator so that the center of gravity in vibration of the whole vibration system composed of a first bending-vibration piece and a second bending-vibration piece may be positioned on a first leg or on its extension line and that of the whole vibration system composed of a third bending-vibration piece and a fourth bending-vibration piece may be positioned on a second leg or on its extension line, by cutting off a part of the vibrator by means of a laser machining process or the like.

The vibrator forming a vibratory gyroscope of the invention can be also formed by a silicon semiconductor process as used in a silicon micromachining process. In this case, an electrostatic force is used in driving the vibrator. In order to detect a bending vibration in a vibrator, a detecting means can be made by making a piezoelectric resistance device, for example, through doping a silicon member.

Figure 16:
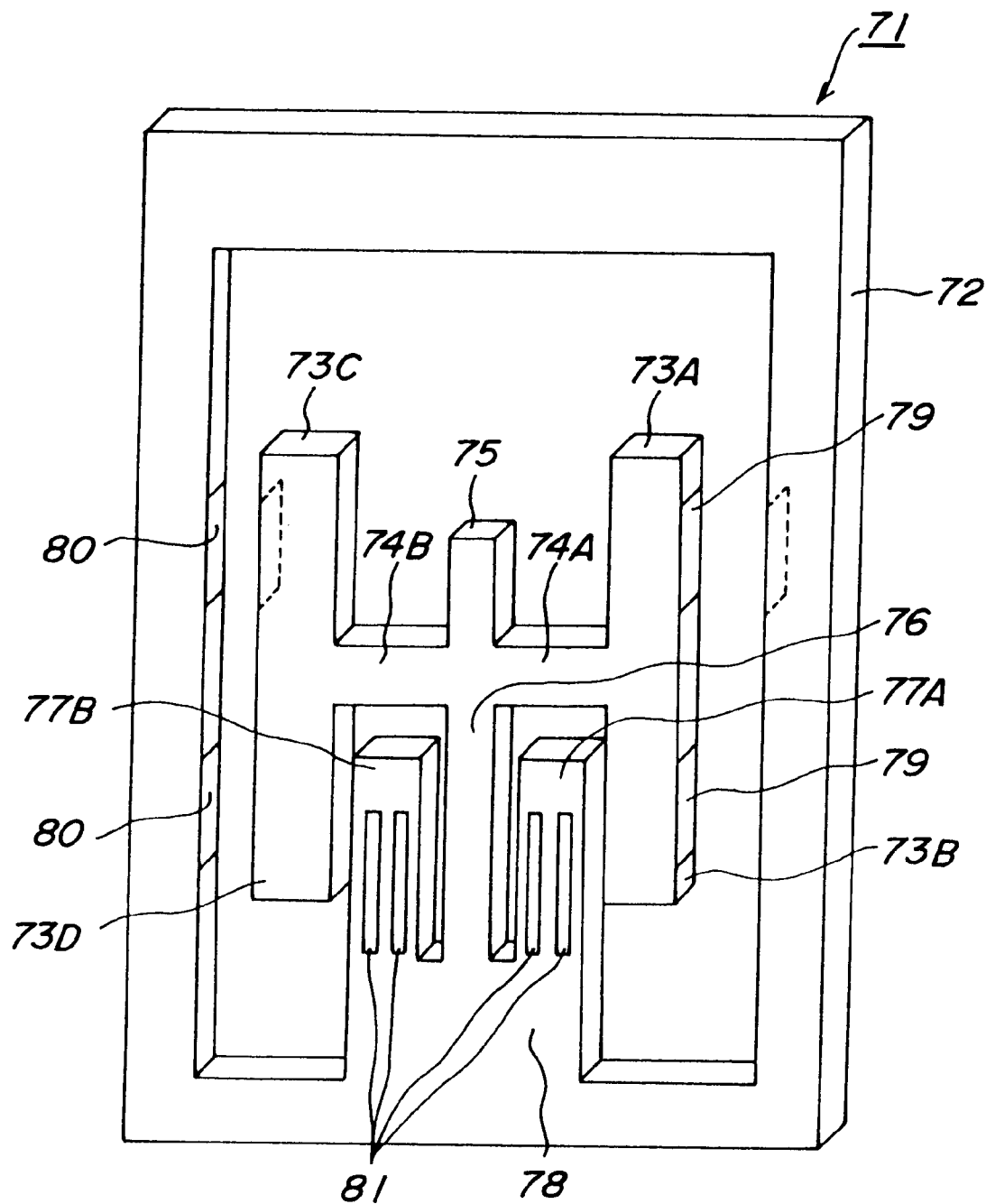
FIG. 16 is a perspective view roughly showing other embodiment of a vibratory gyroscope in which a vibrator is formed by a silicon semiconductor process.

FIG. 16 is a perspective view roughly showing a vibratory gyroscope according to this embodiment. The whole vibrator 71 is formed by a silicon semiconductor process. A projection part (fixing part) 78 is formed inside a frame 72, and a base part 76 and a pair of resonant arms 77A and 77B project from the projection part 78. A first leg 74A and a second leg 74B is formed, extending from the base part 76 perpendicularly to the base part 76 and a projection part 75 from the top end side of the base part 76. A first bending-vibration piece 73A and a second bending-vibration piece 73B, and a third bending-vibration piece 73C and a fourth bending-vibration piece 73D are provided so as to extend perpendicularly to the legs 74A and 74B, respectively.

An electrostatic drive electrode 79 is provided on the outside face of each of the bending-vibration pieces, and an electrostatic drive electrode 80 is provided at a position on the frame 72 opposite to each of the electrostatic drive electrodes 79. The bending-vibration pieces are electrostaticically driven by these electrodes.

A doped-semiconductor domain 81 doped with a specific metal is provided in each of the resonant arms 77A and 77B, and this doped-semiconductor domain forms a piezoelectric resistance device. A change in resistance caused by a stress applied to each of the piezoelectric resistance devices 81 of the respective resonant arms is measured and detected as an index of a turning angular velocity, when the vibrator is turned.

A linear accelerometer can be made by using a vibrator of the invention. In the present invention, since when a linear acceleration is applied to the vibrator a strain proportional to the acceleration occurs in a detection part, a linear acceleration can be measured on the basis of a direct-current detection signal according to this strain. A linear accelerometer using an existing vibrator has a problem that when a driving vibration is given to the vibrator a conventional extending-contracting vibration is generated in the base part by an influence of the driving vibration as described above and a great noise signals caused by this extending-contracting vibration, and the noise signal greatly varies according to a temperature change. When detecting a linear acceleration, it is necessary to subtract a noise signal from a measurement value as a baseline. However, since the noise signal value greatly varies according to a temperature change, a great error is brought at the time of subtracting a noise signal portion from the measurement value.

According to a linear accelerometer using a vibrator of the invention, since a noise signal caused by an extending-contracting vibration taking place in the base part when a driving vibration is given to the vibrator is remarkably reduced, it is possible to prevent an error caused by variation of a noise signal with a temperature change.

A sensor for measuring a turning velocity and a linear acceleration at the same time can be made by using a vibrator of the invention. In the vibrator of the present invention, in case that a turning velocity and a linear acceleration are applied to the vibrator at the same time, a detection signal corresponding to the turning rate and that corresponding to the linear acceleration are generated at the same time. Among the detection signals at this time, a change in amplitude of a signal component having the same frequency as that of the drive signal is proportional to the turning velocity, and a change in a direct-current voltage signal component is proportional to the linear acceleration.

According to the vibratory gyroscope of the invention, when the vibrator is to be supported, that area of the vibrator which moves smallest can be fixed by supporting the vibrator at that small region where a detection vibration is locally smallest. By so doing, the Q value of the detection vibration increases to improve the sensitivity. Since the detection vibration caused by Coriolis is small, from the standpoint of increasing the sensitivity, it is most effective to support the vibration at a small region where the detection vibration is locally smallest.

In this embodiment, it is most preferable that the vibrator is supported at a region where the detection vibration-smallest region overlaps with the driving vibration-smallest region. By so doing, not only the Q value of the detection vibration but also that of the driving vibration increase.

In this embodiment, the region where the detection vibration or the driving vibration is smallest means a region where the ratio of the amplitude of the vibration to the maximum one of the vibrator in the detection vibration or the driving vibration is smallest. The region in which the ratio is not more two thousandth, more preferable not more than one thousandth is preferred.

Further, according to the vibrator of the invention, it is preferable to make the length of the detection arm longer than that of the drive arm. It is more preferable that the ratio in length between the detection arm and the drive arm is set at 1.05 to 1.20: 1.00. It was discovered that the ratio of signal/noise critically increases by so doing. The reason therefor is not clear, but it was found that by making the length of the detection arm longer than that of the drive arm, the noise signal tends to decrease without almost reducing the magnitude of the gyro signal.

The noise signal means a voltage N generating in the detection electrode in the state that the vibrator is not turned at all. The noise signal is considered to be generated mainly when the voltage of the drive signal leaks to the detection electrode. The gyro signal means a signal (R-N) obtained by subtracting the noise signal N from a signal R appearing in the detection signal with respect to a certain turning.

The root portion of each arm undergoing the bending-vibration may be bent at right angles as viewed in a plane, the inventors discovered that the S/N ratio can be further increased by providing a curved face or a tapered face at this root portion. The reason for this is not clear. The arm undergoing the bending vibration specifically means the bending-vibration piece, the resonating arm and the base part.

Figure 17A:
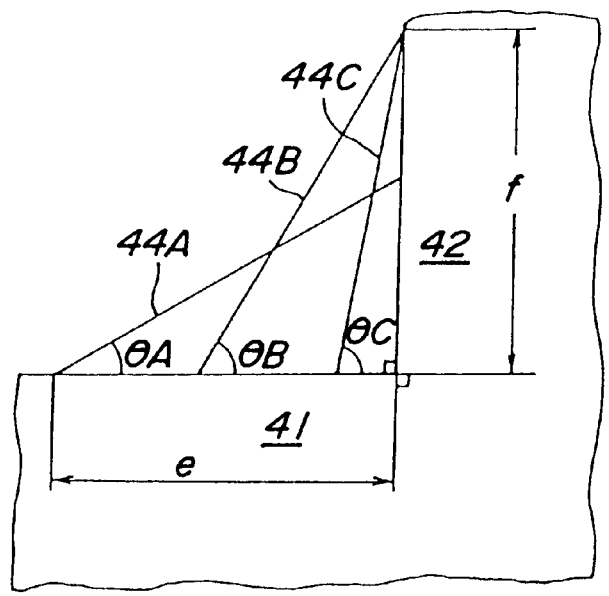
FIG. 17(a) is a schematic view for showing taper faces at a boundary between a bending-vibrating arm 42 and a portion 41 to which the arm 42 is connected.
Figure 17B:
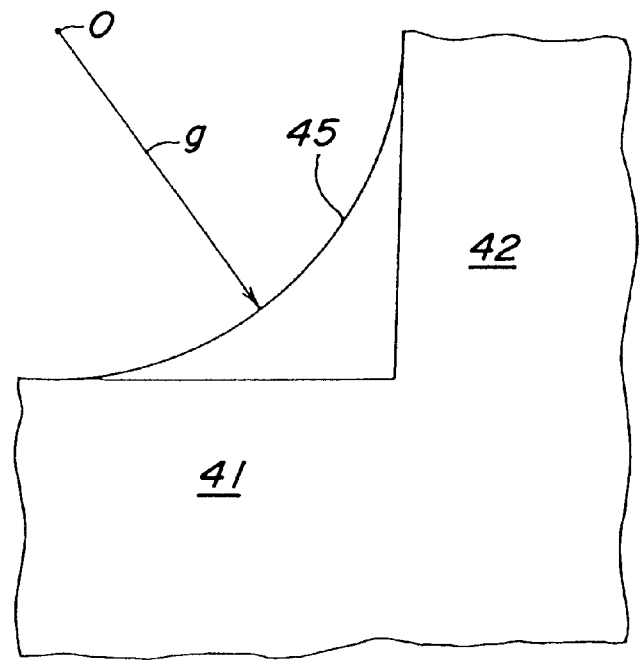
FIG. 17(b) is a schematic view for showing a curved face at the boundary between the bending-vibrating arm 42 and the portion 41 to which the arm 42 is connected.

For example, as shown by a schematic view of FIG. 17(*a*), a bending-vibrating arm 42 continues a portion 41, and the arm 42 is bent relative to the portion 41 at right angles. In this case, the S/N ratio is increased by providing a taper face 44A, 44B or 44C. It was found that the taper angle θA, θB and θC are preferably set at 50°–70°. Further, as shown in FIG. 17(*b*), a curved face 45 may be provided. A letter "g" means a radius of curvature of the curved face 45.

Figure 18:
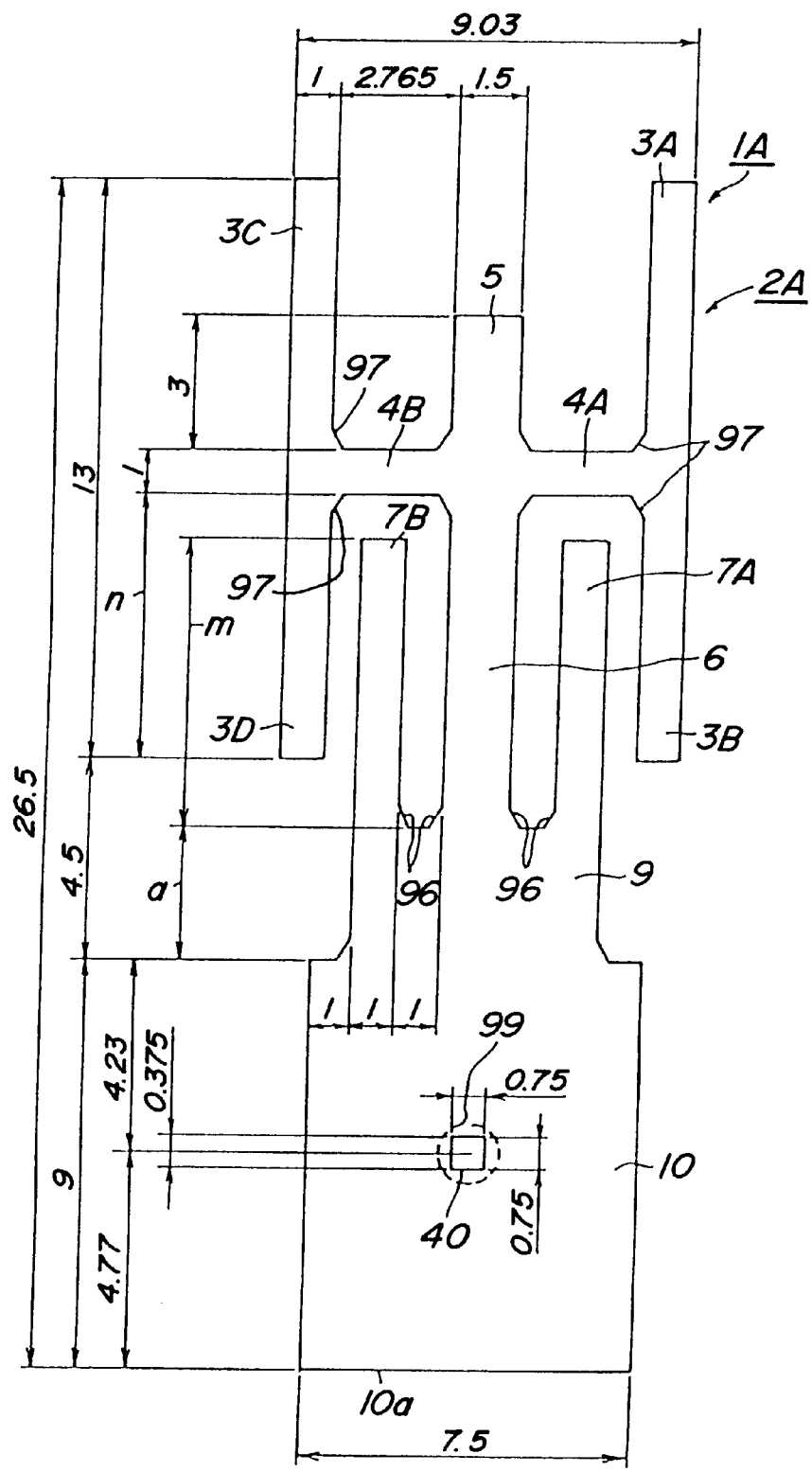
FIG. 18 is a plane view for showing an example of a specific design of the vibratory gyroscope 1A in FIG. 1.

FIG. 18 shows a example of a specific design of the vibrator 2A shown in FIG. 1. The vibrator 2A shown in FIG. 18 was actually produced. Numerical figures showing dimensions of parts in FIG. 18 are mm in unit. The vibrator was formed of crystal having a thickness of 0.3 mm. The dimension "a" was 3 mm. The length "n" of each of the bending vibration pieces 3A, 3B, 3C and 3D as the driving arms was fixed at 6 mm, and the ratio of the length "m" of each of the resonant arms 7A and 7B to "n" was varied as shown in Table 1. The S/N ratio at an angular velocity of 1°/sec. A taper face (taper angle: 60°) was provided at a root portion 96 of each of the resonant arm and the base portion, and such a taper face 97 (taper angle: 60°) was also provided at a root portion of each of the bending-vibration pieces 3A, 3B, 3C and 3D. Each electrode (See FIG. 1) was formed of a chromium layer and a gold layer. Results are shown in Table 1.

TABLE 1

| Length "m" of resonant arm/Length "n" of bending-vibration piece | 0.9 | 1.0 | 1.1 | 1.2 |
|---|---|---|---|---|
| S/N ratio at 1 °/sec. | 0.013 | 0.023 | 0.062 | 0.046 |

Next, in the above-mentioned vibrator of FIG. 18, the length "m" of the detection arm was set at 6.6 mm (m/n=1.1), and the S/N ratio at 1°/sec. was measured. Results are shown in Table 2. In Experiment 1, the portions 96 and 97 were all designed right angles as viewed in a plane.

In Experiment 2, curved faces 45 were formed at a radius of curvature of "g"=5 mm as shown in FIG. 17(*b*). In Experiments 3, 4 and 5, taper faces were formed, as shown in FIG. 17(*a*), at taper angles of θA=30°, θB=60° and θC=120° with "e" and "f" being 5 mm.

TABLE 2

|  | Experiment 1 | Experiment 2 (Curved) | Experiment 3 (30°) | Experiment 4 (60°) | Experiment 5 (80°) |
|---|---|---|---|---|---|
| S/N ratio at 1 °/sec. | 0.023 | 0.065 | 0.031 | 0.061 | 0.025 |

Next, the length "m" of the detection arm was set at 6 mm (m/n=1.1) in the above-mentioned vibrator in FIG. 18, and taper faces 96 and 97 were formed at a taper angle of 60°. In order to examine any influence of the driving vibration mode and the detection vibration mode upon the whole vibrator, the specific mode was analyzed according to a finite element method, and thereby the amplitude of the vibration at each of various points was determined as a distribution of ratios relative to the maximum vibration amplitude point.

Figure 20:
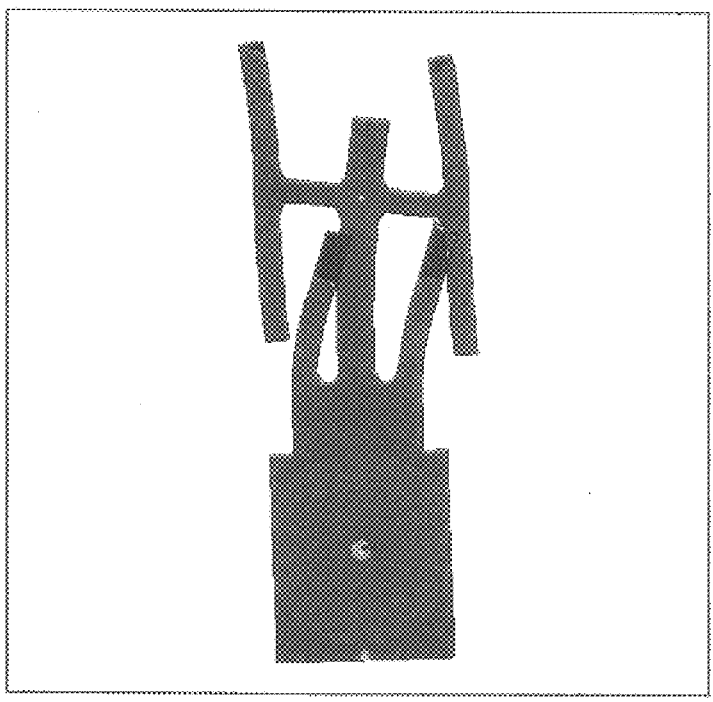
FIG. 20 is a relative ratio of a maximum vibration amplitude at a detection vibration mode at each point of the vibrator.

FIG. 19 shows a relative ratio of the amplitude at a time of maximum vibration in the drive vibration mode at each point of the vibrator, and FIG. 20 shows a relative ratio of the amplitude at a time of maximum vibration in the detection vibration mode at each point of the vibrator. In FIGS. 19 and 20, regions having different colors are regions having different ratios to the maximum vibration amplitude point. An orange region is a region having the minimum amplitude.

According to FIG. 19, the influences of the driving vibration systems offset each other in the base part 6. Due to this, almost no influence of the driving vibration is seen in the base part 6 and the resonant arms. According to FIG. 20, no influence of the detection vibration is seen in a region 99 (See FIG. 18) near the center of the fixing portion 10.

In this embodiment, it is clarified from FIGS. 19 and 20 that the minimum amplitude region of the driving vibration and that of the detection vibration are locally positioned in the central portion of the fixing portion as shown in FIG. 18 by 99. Therefore, the region 99 is fixedly supported. At that time, supporting the vibrator is not limited to any particular fixing way, and any supporting way and any fixing way can be employed.

For example, any known bonding method is used for bonding the piezoelectric material. One example is that a given supporting hole 40 is provided in the region 99, and the vibrator can be fixed by inserting a given supporting member into the support hole 40. For example, the supporting member is projected from a vibrator-supporting jig not shown, and the vibrator can be fixed by inserting this supporting member. When the vibrator is to be fixedly supported by inserting the supporting member into the supporting hole 40, a metallizing layer is formed on a surface of the supporting member and/or the inner peripheral surface of the supporting hole 40, and the supporting member is soldered or brazed to the inner peripheral surface of the supporting hole. Alternatively, the vibrator can be fixed by arranging a resin between the supporting member and the supporting hole 40.

The supporting hole 40 may penetrate the vibrator, or may not penetrate it. When the supporting hole 40 penetrates the vibrator, the supporting member may pass through the supporting hole, or may not pass through it. When the vibrator is provided with no supporting hole 40, the supporting member may be soldered to front and/or rear surfaces of the region 99 or bonded thereto with a resin.

In the above mentioned vibrator of FIG. 18, the inventors effected "bottom-fixing" or "node point-fixing" as indicated in Table 3. The "bottom-fixing" means that an end face 10*a* of the fixing portion was held. The "node point-fixing" means that a metallizing layer was formed on a surface of the supporting member, a supporting member was inserted into a supporting hole, the supporting member was into the supporting hole 40, and the supporting member was soldered to the inner surface of the supporting hole 40.

TABLE 3

|  | Q-value of driving mode | Q-value of detection mode | Sensitivity |
|---|---|---|---|
| Bottom-fixing | 3000 | 200 | 0.5 mV |
| Node point-fixing | 5000 | 3000 | 1.8 mV |

Further, in a preferred embodiment of the vibratory gyroscope of the present invention, an electric signal used to generate driving vibration is used as a reference signal, vibration having a vibration mode different from that of the driving vibration is taken out as an electric signal by the detector, and this signal is used as an output signal. An angular velocity is detected by detecting a difference in phase between the reference signal and the output signal, and an angular velocity is detected based on a change in the detected phase difference.

Figure 21:
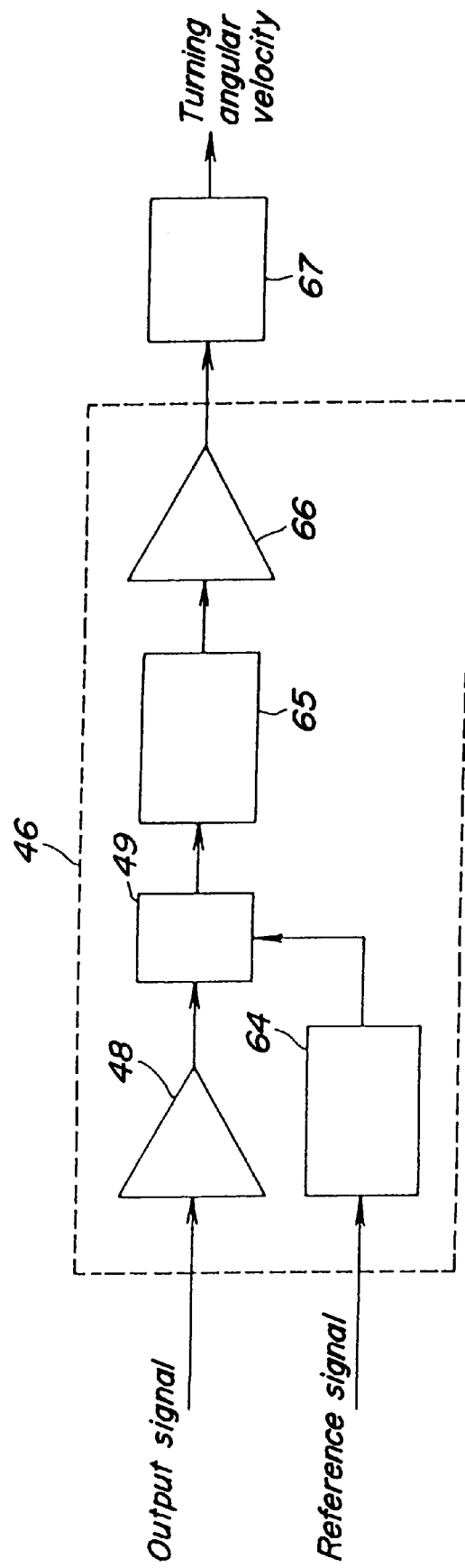
FIG. 21 is a block diagram for showing an arrangement of a phase detector to be favorably used in detecting the angular velocity in the vibratory gyroscope according to the present invention.

FIG. 21 is a block diagram showing an example of a phase difference detector to be used in the above method.

In the phase difference detector 46 shown in FIG. 21, an output signal is amplified in an AC amplifier 48, and then fed to a phase difference-detecting circuit 49. A reference signal is preliminarily processed in a reference signal preliminarily processing circuit 64 where the wave shape or the like of the reference signal is rectified, and then also fed to the phase difference-detecting circuit 49. The phase difference-detecting circuit 49 detects a difference in phase between the preliminarily processed reference signal and the output signal fed thereto. A signal representative of the detected phase difference is fed to a low pass filter 65 and a DC amplifier 65 where the signal is converted to a DC signal having an intensity corresponding to that of the phase difference. The DC signal determined by the above phase difference detector 46 is fed to a turning angular velocity detecting circuit 67 where a turning angular velocity is determined based on a preliminarily determined relationship between the intensity of the DC signal and the turning angular velocity.

In the above-mentioned circuit 46, since the difference in phase between the output signal and the reference signal cannot be determined as an index value, the turning angular velocity is determined based on the intensity of the DC signal corresponding to the phase difference. However, the turning angular velocity can be determined based on the relationship between the preliminarily determined phase difference and the turning angular velocity through the direct determination of a phase difference as a numerical value.

It was clarified that the vibratory gyroscope according to the invention is particularly suited for the detection of the phase difference in such a manner, and can give high linearity between the phase difference and the turning angular velocity. It was also clarified that extremely high linearity can be obtained particularly between the phase difference and the turning angular velocity in a region where a ratio between a gyro signal and a leakage signal is 1: not less than 7, that is, in a region where the leakage signal is larger than the gyro signal. If the leakage signal becomes too large, the gyroscope exceeds its detection limit even if a piezoelectric single crystal is used. Therefore, the upper limit of the leakage signal is determined depending upon the detection sensitivity of the vibratory gyroscope.

As mentioned above, even if the detection sensitivity decreases in the region where the leakage signal is larger than the gyro signal, particularly in the region where the ratio of the gyro signal to the leakage signal is 1: not less than 7, the linearity between the phase difference and the turning angular velocity is rather improved.

Further, the vibrator according to the present invention can be produced by laminating two or more piezoelectric layers. In this case, the directions of the polarization axes of the piezoelectric layers are preferably made different from one another. It is most preferable that the directions of the polarization axes of the piezoelectric layers are orthogonal to the main plane of the vibrator.

Figure 22:
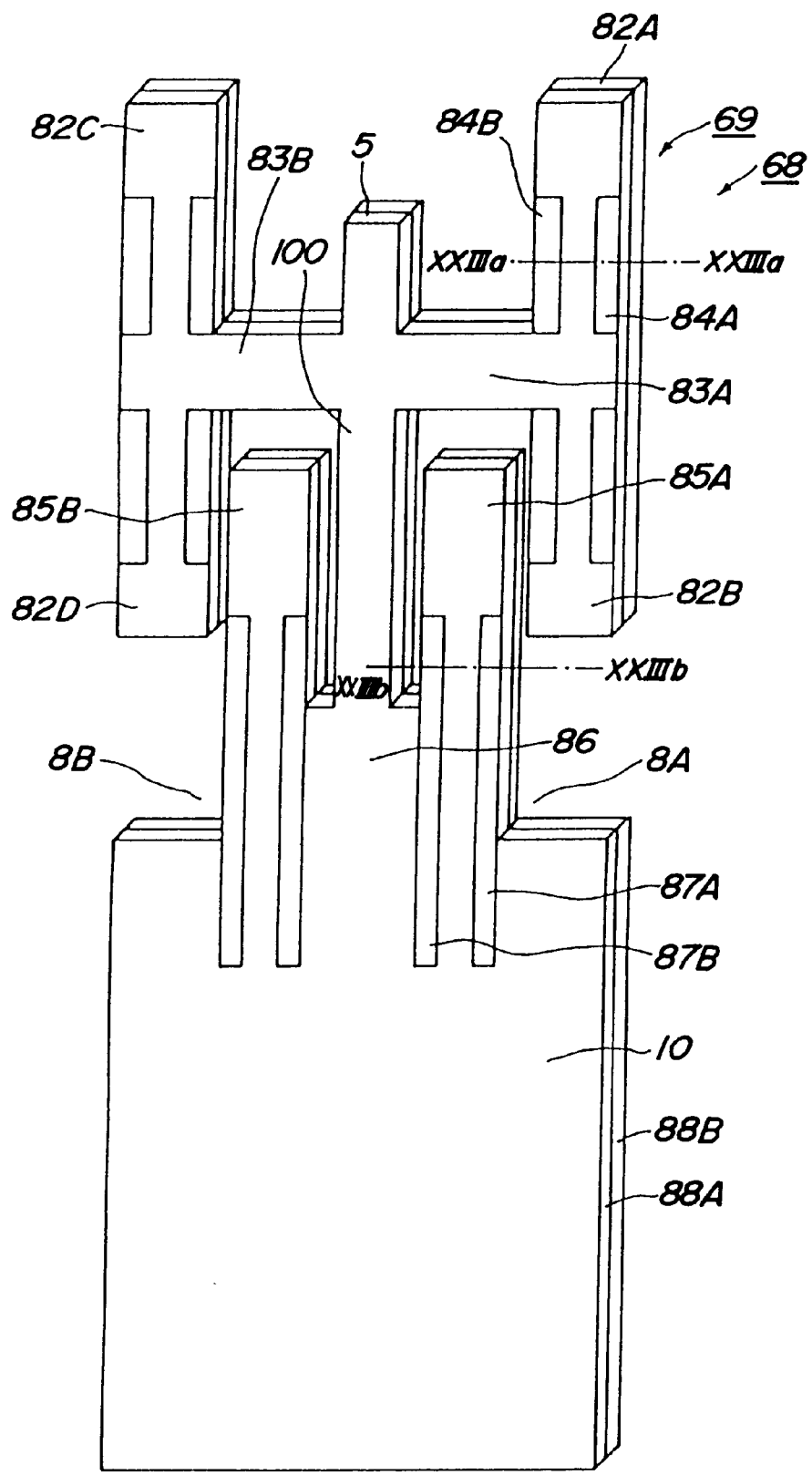
FIG. 22 is a perspective view for roughly showing vibrators 69 formed by laminating plural piezoelectric layers 88A and 88B and a vibratory gyroscope 68 with this vibrator 69.
Figure 24:
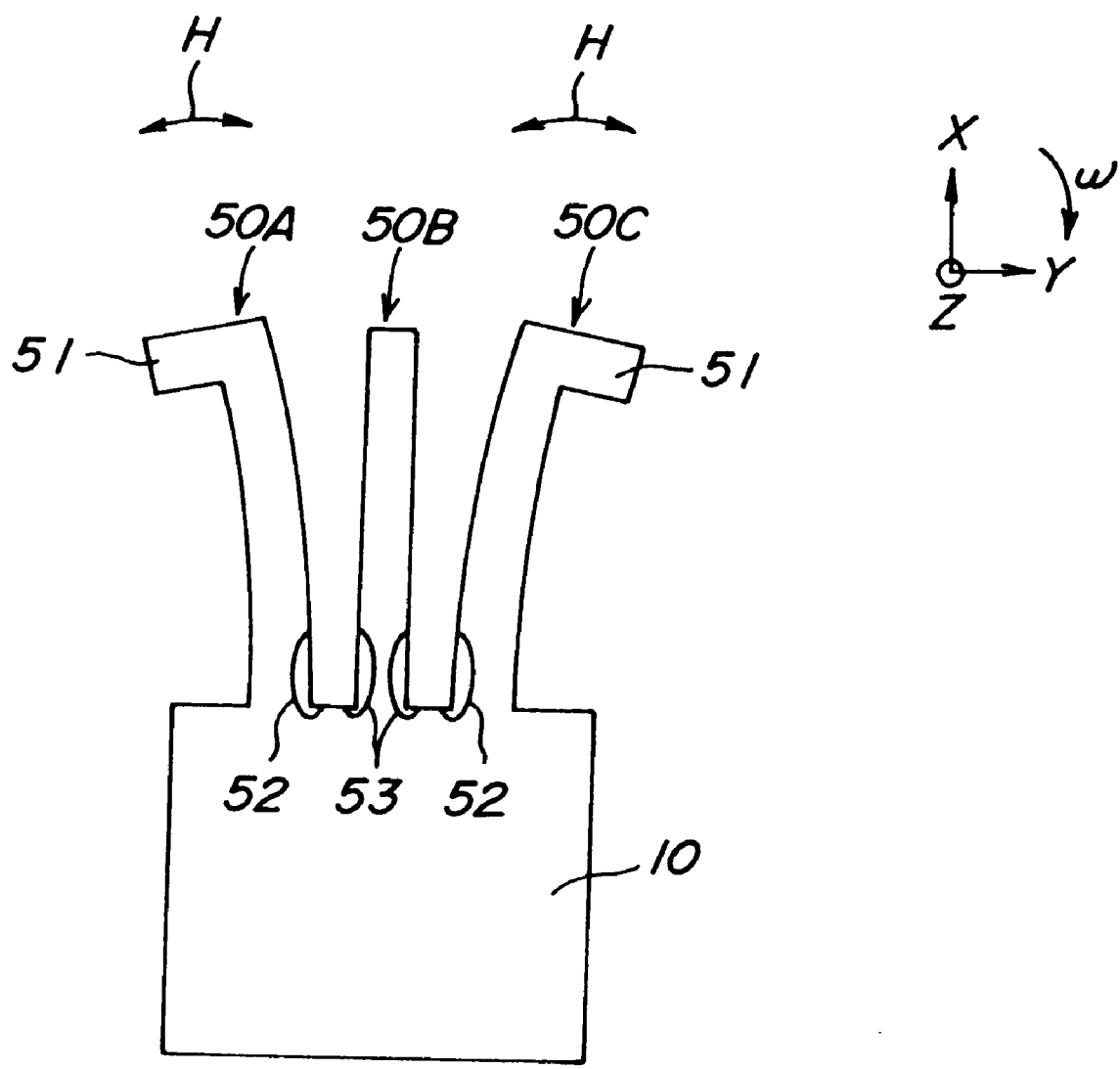
FIG. 24 is a rough view for explaining a driving vibration of a conventional vibratory gyroscope.
Figure 25A:
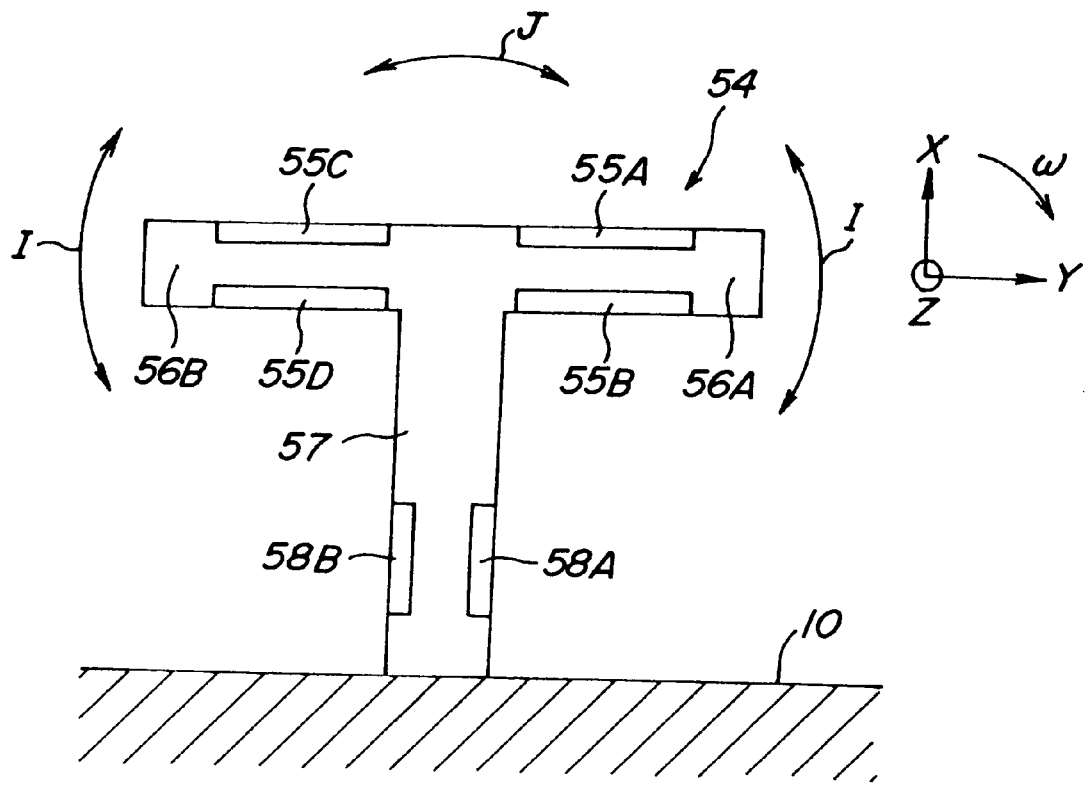
FIG. 25(a) is a front view showing an example of a vibratory gyroscope developed by the inventors.
Figure 25B:
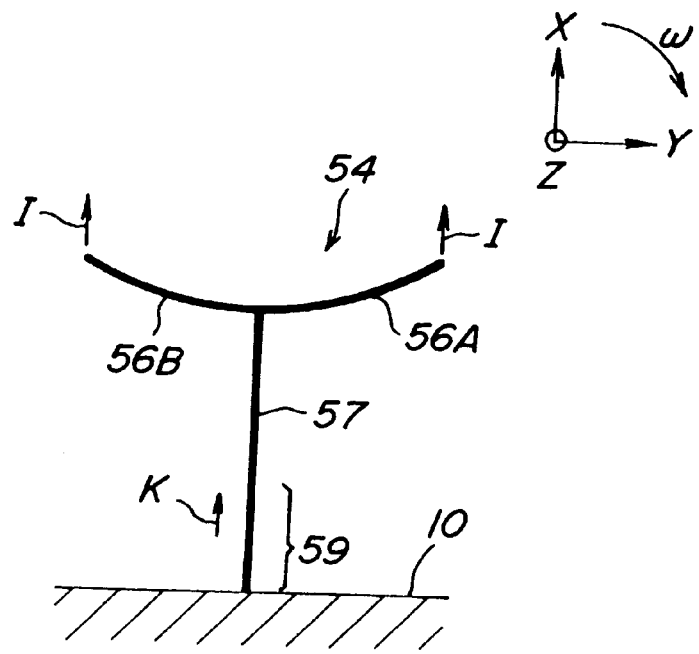
FIG. 25(b) is a diagram for explaining a driving vibration of the vibratory gyroscope shown in FIG. 25(a).

FIG. 22 is a perspective view roughly showing a vibratory gyroscope 68 and a vibrator 69 according such an embodiment. FIGS. 23(a) and 23(b) are sectional views of FIG. 22 taken along a line XXIII(a)—XXIII(a) and a line XXIII (b)—XXIII(b), respectively.

The whole vibrator 69 is constituted by a joined body composed of two planar bodies 88A and 88B. The polarization direction (shown by an arrow 91) of the planar body 88A is completely reverse to that (shown by an arrow 92) of the planar body 88B, and orthogonal to opposed main planes 90A and 90B, respectively.

A base part 100 and a pair of resonant arms 85 extend from a projection 86 of a fixing portion 10 in parallel. A first leg 83A and a second leg 83B extend from a tip portion of the base part in a direction perpendicular to the base part. A projection 5 is provided, projecting from an intersection between the legs 83A and 83B in a direction opposite to the base part.

A first bending-vibration piece 82A and a second bending-vibration piece 82B extend orthogonally from the tip end of the first leg 83A in opposite directions. A third bending-vibration pieces 82C and 82D extend orghogonally from the tip end of the second leg 83B in opposite directions.

For example, the bending-vibration pieces 82A, 82B, 82C and 82D can be vibrated in directions X as shown by an arrow H in FIG. 23. To this end, for example, the electrodes 84A and 84C are connected to an AC power source 94, the electrodes 84B and 84D are earthen, and a electric field is applied between the electrodes 84A and 84B and between the electrodes 84C and 84D. The direction of the polarization axis and that of the electric field are reversed between planar piezoelectric layers 88A and 88B at regions near the electrodes 84A and 84B, whereas the direction of the polarization axis and that of the electric field are the same between the planar piezoelectric layers 88A and 88B at regions near the electrodes 84B and 84D. Therefore, the bending-vibration pieces vibrate in arrow directions H.

When the vibrator 69 is turned around a z-axis as shown by ω, each of the resonant arms 85A and 85B vibrate as shown by the arrows H. As shown in FIG. 23(b), an electromotive force is generated between the electrodes 87A and 87B and between the electrodes 87C and 87D in the resonant arm 85A (85B). The electrodes 87B and 87D are earthen, and the electrodes 87A and 87C are preliminarily connected to a given voltage detector 95. The turning angular velocity is calculated by measuring the voltage.

As apparently known from the above description, according to the invention, it is possible to provide the novel vibratory gyroscope capable of detecting a turning angular velocity when particularly the vibrator extending in a specific plane is turned in this specific plane. Further, it is possible to prevent the phenomenon that noises are generated in a detection signal by an extending-contracting vibration generated in a detection part of the vibrator according to a driving vibration thereof.

What is claimed is:

1. A single crystal vibrator, comprising:
   a base part including a fixed end,
   a first leg extending in a direction crossing said base part,
   a second leg extending in a direction crossing said base part and being opposed to said first leg with respect to said base part, said first and second legs being joined with said base part at an intersecting part,
   a first bending-vibration piece extending in a direction crossing said first leg,
   a second bending-vibration piee extending in a direction crossing said first leg and being opposite to said first bending-vibration piece with respect to said first leg,
   a third bending-vibration piece extending in a direction crossing said second leg,
   a fourth bending-vibration piece extending in a direction crossing said second leg and being opposite to said third bending-vibration piece with respect to said second leg, and
   a projection part extending in a direction opposite to said base part from said intersecting part,
   wherein said base part, said first and second legs, said first, second, third and fourth bending-vibration pieces, and said projection part all are substantially planar and lie in the same plane.

2. A vibrator as defined in claim 1, wherein:
   vibrations of said first bending-vibration piece and said second bending-vibration piece are symmetrical in phase to each other with respect to said first leg, and vibrations of said third bending-vibration piece and said fourth bending-vibration piece are symmetrical in phase to each other with respect to said second leg.

3. A vibrator as defined in claim 2, wherein:
   the center of gravity in a vibration of the whole vibration system comprising said first bending-vibration piece and said second bending-vibration piece is on said first leg or on an extension line thereof, and the center of gravity in a vibration of the whole vibrating system comprising said third bending-vibration piece and said fourth bending-vibration piece is on said second leg or on an extension line thereof.

4. A vibrator as defined in claim 1, wherein:
a vibration of the center of gravity in a vibration of the whole vibration system comprising said first leg, said first bending-vibration piece and said second bending-vibration piece and the center of gravity in a vibration of the whole vibration system said second leg, said third bending-vibration piece and said fourth bending-vibration piece are symmetrical in phase to each other with respect to said base part.

5. A vibrator as defined in claim 4, wherein:
a stress applied to said base part by a vibration of the whole vibration system comprising said first leg, said first bending-vibration piece and said second bending-vibration piece and a stress applied to said base part by a vibration of the whole vibration system comprising said second leg, said third bending-vibration piece and said fourth bending-vibration piece offset each other in said base part.

6. A vibrator as defined in claim 4, wherein:
the center of gravity in a vibration of the whole vibration system comprising said first leg, said first bending-vibration piece, said second bending-vibration piece, said second leg, said third bending-vibration piece, and said fourth bending-vibration piece is on said base part or on an extension line thereof.

7. A vibrator as defined in claim 5, wherein:
the center of gravity in a vibration of the whole vibration system comprising said first leg, said first bending-vibration piece, said second bending-vibration piece, said second leg, said third bending-vibration piece, and said fourth bending-vibration piece is on said base part or on an extension line thereof.

8. A linear accelerometer for detecting a linear acceleration, comprising:
a vibrator as defined in claim 1, and
detecting means for detecting deformation of said vibrator generated by a Newton force applied to said vibrator when a linear acceleration is applied to said vibrator.

9. A vibrator as defined in claim 1, further comprising:
a fixing part for fixing said fixed end of said base part, and first and second resonant arms protecting from said fixing part for resonating with a vibration of said base part.

10. A vibrator as defined in claim 9, wherein:
the projecting dimensions of both sides of each of said first and second resonant arms from the base part are different from each other.

11. A vibrator as defined in claim 1, wherein a through hole is formed in each of the bending-vibration pieces, extending in a longitudinal direction of said bending-vibration piece.

12. A vibrator as defined in claim 9, wherein:
a through hole is formed in each of said first and second resonant arms, extending in a longitudinal direction thereof.

13. A vibrator as defined in claim 1, wherein:
a fixing part is provided for fixing said fixed end,
said fixing part includes fixed ends, and
said base part is provided on one side of said fixing part, and resonant arms are provided on the other side of said fixing part.

14. A vibrator as defined in claim 9, wherein:
said fixing part includes fixed ends, and
said base part is provided on one side of said fixing part, and resonant arms are provided on the other side of said fixing part.

15. A vibratory gyroscope for detecting a turning angular velocity comprising a vibrator as defined in claim 1, further comprising:
exciting means for exciting a vibration in a specific plane in said vibrator; and
detecting means for detecting a bending vibration of said vibrator generated by a Coriolis force applied to said vibrator when said vibrator is turned in said specific plane and outputting a signal according to said bending vibration.

16. A vibratory gyroscope for detecting a turning angular velocity, as defined in claim 15, wherein:
said exciting means comprises means for exciting a bending vibration in each of said first bending-vibration piece, said second bending-vibration piece, said third bending-vibration piece and said fourth bending-vibration piece, and said detecting means comprises means for detecting a bending vibration in said base part generated by a Coriolis force applied to said vibrator when said vibrator is turned in said specific plane and outputting a signal according to said bending vibration.

17. A vibratory gyroscope for detecting a turning angular velocity, comprising:
a vibrator as defined in claim 9,
exciting means for exciting a bending vibration in each of said first bending-vibration piece, said second bending-vibration piece, said third bending-vibration piece and fourth bending-vibration piece, and
detecting means for detecting a bending vibration in one of said first and second resonant arms generated by a Coriolis force applied to said vibrator when said vibrator is turned in said specific plane and outputting a signal according to said bending vibration.

18. A vibratory gyroscope for detecting a turning angular velocity, comprising:
a vibrator as defined in claim 13,
exciting means for exciting a bending vibration in each of said first bending-vibration piece, said second bending-vibration piece, said third bending-vibration piece and said fourth bending-vibration piece, and
detecting means for detecting a bending vibration in said resonant arm generated by a Coriolis force applied to said vibrator when said vibrator is turned in said specific plane and outputting a signal according to said bending vibration.

19. A linear accelerometer for detecting a linear acceleration, comprising:
a vibrator as defined in one of claim 9, and
detecting means for detecting deformation of said vibrator generated by a Newton force applied to said vibrator when a linear acceleration is applied to said vibrator.

20. A linear accelerometer for detecting a linear acceleration, comprising:
a vibrator as defined in one of claim 13, and
detecting means for detecting deformation of said vibrator generated by a Newton force applied to said vibrator when a linear acceleration is applied to said vibrator.

21. A single crystal vibrator, comprising:
a fixing part having fixed ends,
a base part including a fixed end connected to a first side of said fixing part,
a first leg extending in a direction crossing said base part,
a second leg extending in a direction crossing said base part and being opposed to said first leg with respect to said base part, a first bending-vibration piece extending in a direction crossing said first leg, a second bending-vibration piece extending in a direction crossing said first leg and being opposite to said first bending-vibration piece with respect to said first leg, a third bending-vibration piece extending in a direction crossing said second leg, a fourth bending-vibration piece extending in a direction crossing said second leg and being opposite to said third bending-vibration piece with respect to said second leg, and resonant arms connected to a second side of said fixing part.

22. A single crystal vibrator, comprising:

a base part including a fixed end, a first leg extending in a direction crossing said base part, a second leg extending in a direction crossing said base part and being opposite to said first leg with respect to said base part, said first and second legs being joined with said base part at an intersecting part, a first vibration system provided on one side of said first leg, a second vibration system provided on the other side of said first leg, a third vibration system provided on one side of said second leg, a fourth vibration system provided on the other side of said second leg, and a projection part extending in a direction opposite to said base part from said intersecting part, wherein (i) a vibration of the center of gravity of said first vibration system is symmetrical in phase to a vibration of the center of gravity of said second vibration system with respect to said first leg, (ii) a vibration of the center of gravity of said third vibration system is symmetrical in phase to a vibration of the center of gravity of said fourth vibration system with respect to said second leg, and (iii) said base part, said first and second legs, said first, second, third and fourth bending-vibration systems, and said projection part all are substantially planar and lie in the same plane.

23. A vibrator as defined in claim 22, wherein:

the center of gravity in a vibration of the whole vibration system comprising said first vibration system and said second vibration system is on said first leg or on an extension line thereof, and the center of gravity in a vibration of the whole vibration system comprising said third vibration system and said fourth vibration system is on said second leg or on an extension line thereof.

24. A vibrator as defined in claim 22, wherein:

a vibration of the center of gravity in a vibration of the whole vibration system comprising said first leg, said first vibration system and said second vibration system, is symmetrical in phase to a vibration of the center of gravity in a vibration of the whole vibration system comprising said second leg, said third vibration system and said fourth vibration system with respect to said base part.

25. A vibrator as defined in claim 24, wherein:

a stress applied to said base part by a vibration of the whole vibration system comprising said first leg, said first vibration system and said second vibration system and a stress applied to said base part by a vibration of the whole vibration system comprising said second leg, said third vibration system and said fourth vibration system offset each other in said base part.

26. A vibrator as defined in claim 24, wherein:

the center of gravity in a vibration of the whole vibration system comprising said first leg, said first vibration system, said second vibration system, said second leg, said third vibration system and said fourth vibration system is on said base part or on an extension line thereof.

27. A vibrator as defined in one of claims 22, wherein said first vibration system is a first bending-vibration piece extending in a direction crossing said first leg, said second vibration system is a second bending-vibration piece extending in a direction crossing said first leg and being opposite to said first bending-vibration piece with respect to said first leg, said third vibration system is a third bending-vibration piece extending in a direction crossing said second leg, and said fourth vibration system is a fourth bending-vibration piece extending in a direction crossing said second leg and being opposite to said third bending-vibration piece with said second leg as an axis.

28. A single crystal vibrator, comprising:

a base part including a fixed end, a first leg extending in a direction crossing said base part, a second leg extending in a direction crossing said base part and being opposite to said first leg with said base part as an axis, said first and second legs being joined with said base part at an intersecting part, a first vibration system provided on one side of said first leg, a second vibration system provided on the other side of said first leg, a third vibration system provided on one side of said second leg, a fourth vibration system provided on the other side of said second leg, and a projection part extending in a direction opposite to said base part from said intersecting part, wherein (i) a vibration of the center of gravity in a vibration of the whole vibration system comprising said first leg, said first vibration system and said second vibration system is symmetrical in phase to a vibration of the center of gravity in a vibration of the whole vibration system comprising said second leg, said third vibration system and said fourth vibration system with respect to said base part, and (ii) said base part, said first and second legs, said first, second, third and fourth bending-vibration systems, and said projection part all are substantially planar and lie in the same plane.

29. A vibrator as defined in claim 28, wherein:

a stress applied to said base part by a vibration of the whole vibration system comprising said first leg, said first vibration system and said second vibration system and a stress applied to said base part by a vibration of the whole vibration system comprising said leg, said third vibration system and said fourth vibration system offset each other in said base part.

30. A vibrator as defined in claim 28, wherein:

the center of gravity in a vibration of the whole vibration system comprising said first leg, said first vibration system, said second vibration system, said second leg, said third vibration system and said fourth vibration system is on said base part or on an extension line thereof.

31. A vibrator as defined in claim 28, wherein:
a vibration of the center of gravity of said first vibration system is symmetrical in phase to a vibration of the center of gravity of said second vibration system with respect to said first leg, and a vibration of the center of gravity of said third vibration system is symmetrical in phase to a vibration of the center of gravity of said fourth vibration system with respect to said second leg.

32. A vibrator, comprising:
a fixing part,
a base part including a fixed end connected to said fixing part,
a first leg extending in a direction crossing said base part,
a second leg extending in a direction crossing said base part and being opposed to said first leg with respect to said base part,
a first bending-vibration piece extending in a direction crossing said first leg,
a second bending-vibration piece extending in a direction crossing said first leg and being opposite to said first bending-vibration piece with respect to said first leg,
a third bending-vibration piece extending in a direction crossing said second leg,
a fourth bending-vibration piece extending in a direction crossing said second leg and being opposite to said third bending-vibration piece with respect to said second leg, and
first and second resonant arms projecting from said fixing part and resonating with vibration of said base part.

33. A vibrator, comprising:
a base part including a fixed end,
a first leg extending in a direction crossing said base part,
a second leg extending in a direction crossing said base part and being opposed to said first leg with respect to said base part,
a first bending-vibration piece extending in a direction crossing said first leg,
a second bending-vibration piece extending in a direction crossing said first leg and being opposite to said first bending-vibration piece with respect to said first leg,
a third bending-vibration piece extending in a direction crossing said second leg, and
a fourth bending-vibration piece extending in a direction crossing said second leg and being opposite to said third bending-vibration piece with respect to said second leg,
wherein a through hole is formed in each of the bending-vibration pieces, extending in a longitudinal direction of said bending-vibration pieces.

* * * * *